United States Patent [19]

Brauser et al.

[11] 4,134,708
[45] Jan. 16, 1979

[54] WIND DRIVEN ELECTRIC POWER PLANT

[76] Inventors: Bradley O. Brauser, 1512 Nicklas, Oklahoma City, Okla. 73127; Stanley O. Brauser, 511 Ranchwood, Yukon, Okla. 73099

[21] Appl. No.: 753,265

[22] Filed: Dec. 22, 1976

[51] Int. Cl.² ............................................. F01B 25/06
[52] U.S. Cl. ........................................ 415/30; 415/2; 416/41; 290/55
[58] Field of Search ....................... 415/2–4, 415/30; 416/13, 41; 290/43, 44, 54, 55

[56] References Cited

U.S. PATENT DOCUMENTS

| 1,298,247 | 3/1919 | Muller | 415/2 |
| 1,687,181 | 10/1928 | Prease | 415/2 |
| 2,106,557 | 1/1938 | Putnam | 416/41 |
| 2,252,523 | 8/1941 | Plotkin | 415/2 |
| 2,379,857 | 7/1945 | Bakke | 416/41 |
| 2,832,895 | 4/1958 | Hutter | 416/41 |
| 3,895,882 | 7/1975 | Moyer | 415/2 |
| 3,902,072 | 8/1975 | Quinn | 416/41 |
| 4,003,676 | 1/1977 | Sweeney et al. | 416/41 |

*Primary Examiner*—C. J. Husar
*Attorney, Agent, or Firm*—Dunlap, Codding & McCarthy

[57] ABSTRACT

A wind driven power plant for the generation of electric power comprising a rotor, a shield, and a fin mounted on a vertical, central shaft, the fin and shield adjustably interconnected via a cog and gear track arrangement affording variable relative alignment of the fin and shield to position the shield relative to the wind. A constant rotor rotation rate is achieved by varying the masking thereof by the shield to compensate for wind speed variations. A hydraulic rotation rate control system senses the rotation rate of the rotor and generates a signal permitting the adjustment of the relative orientation of the fin and the shield. The rotor is coupled to a conventional electric generator for the generation of electric power.

25 Claims, 10 Drawing Figures

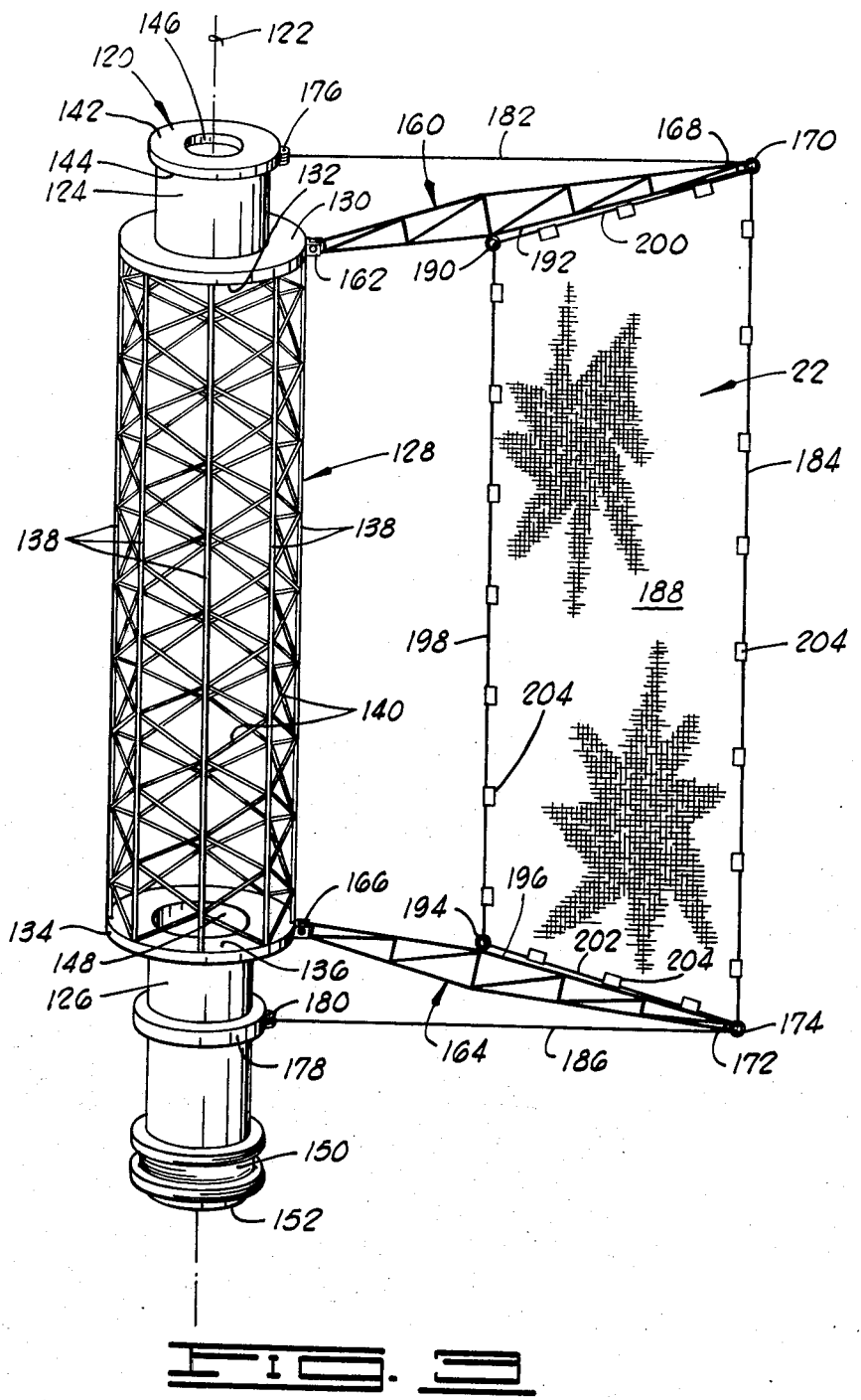

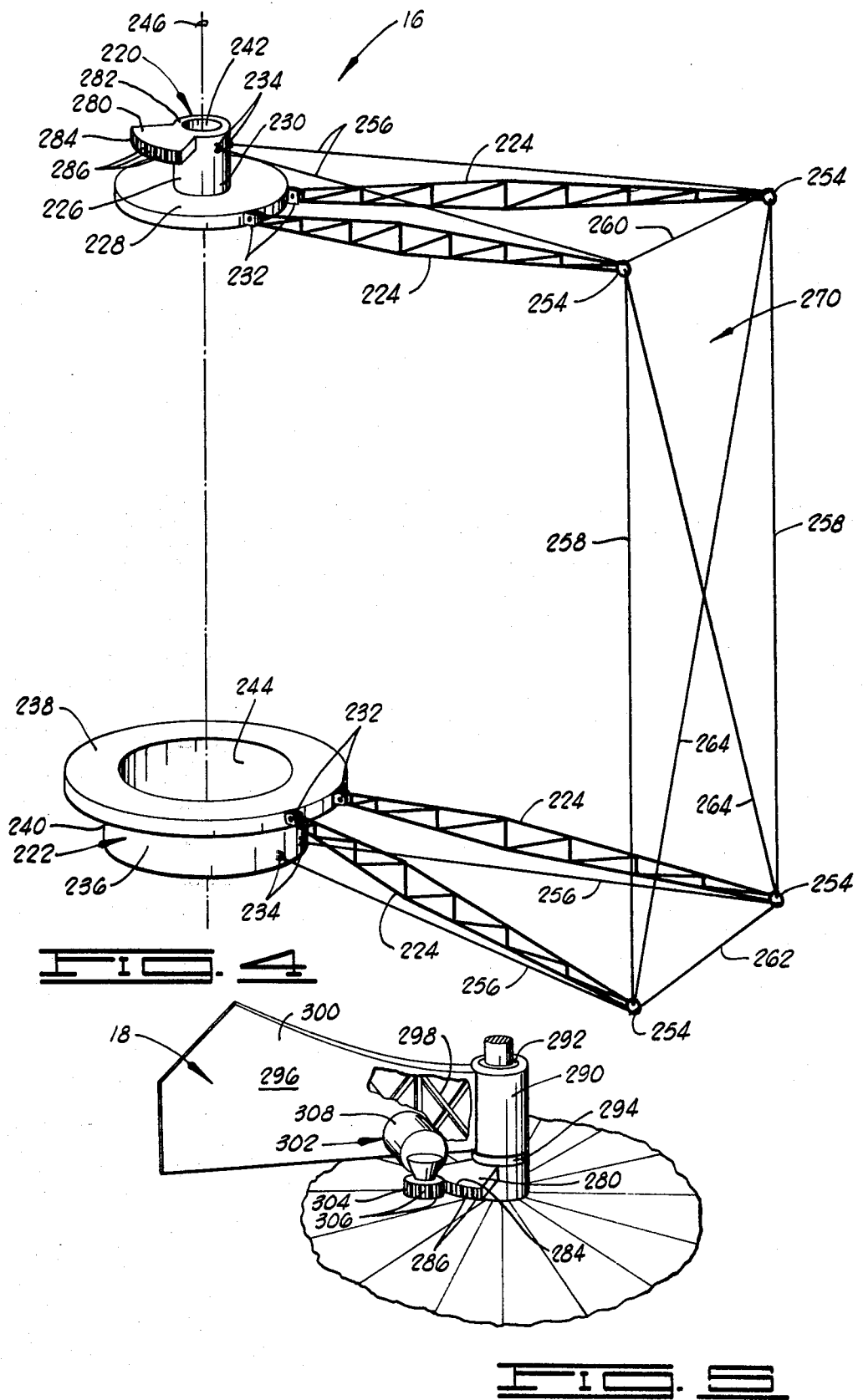

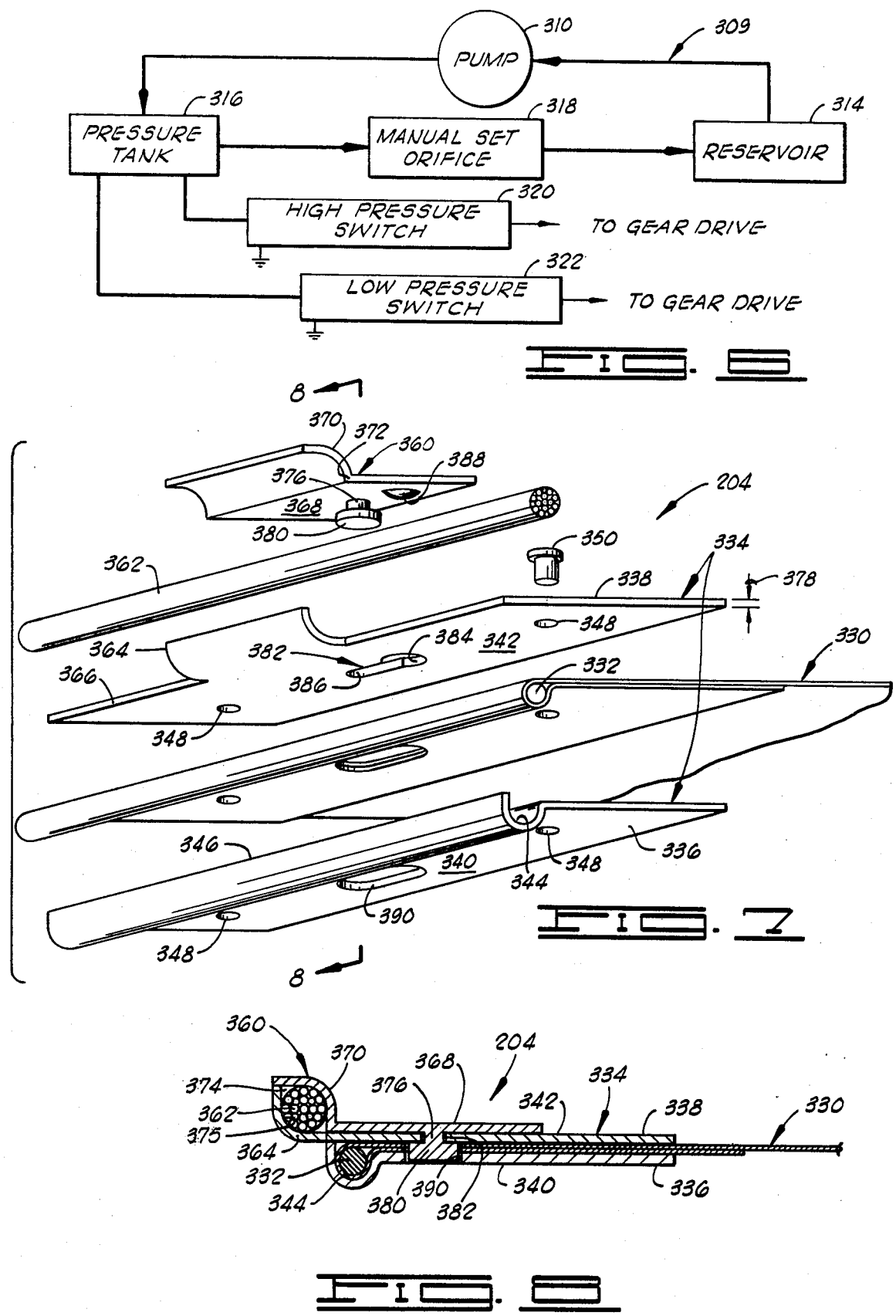

WIND DRIVEN ELECTRIC POWER PLANT

BACKGROUND OF THE INVENTION

1. Field of Invention

This invention relates generally to wind driven power generation plants and, more particularly, but not by way of limitation, to power plants which utilize windmills having automatic rotation rate controls.

2. Brief Description of the Prior Art

The use of windmills as a source of energy has long been known, examples of which are well-known windmills of the Netherlands and, closer to home, the small windmills that dot the rural American landscape. While such windmills have proven to be effective means of accomplishing the tasks for which they are designed, they do not have the characteristics necessary for their inclusion in a power distribution grid. In particular, the rotation rate of such windmills is usually uncontrolled because their use is such that rotation rate control is unnecessary. A windmill of this type is generally used to drive a mechanical system which carries out a desired function at the site of the windmill and the rate at which the mechanical system is driven is usually not critical.

On the other hand, rotation rate control is an essential element of a windmill designed for the generation of electric power. As is well-known, generators are based on Faraday's law of induction which states that the electromotive force induced in a conducting loop is proportional to the time rate of change of the flux of the magnetic induction passing through the loop. In a generator, regardless of the specific details of its design, one or more windings are arranged so that the rotation of the shaft of the generator will result in a corresponding cyclic variation of the flux of the magnetic induction in the windings. Since, in accordance with Faraday's law, this cyclic rate is reflected both in the frequency and the amplitude of the output of the generator, the output of the generator will depend on the rotation rate of the generator shaft through the correspondence between the rotation rate of the shaft and the frequency of the cyclic rate at which the flux of the magnetic induction in the generator windings is varied.

In order to permit the efficient generation and widespread distribution of electricity, the frequency and amplitude requirements of electric motors used in industrial machinery and in home appliances have been standardized and electric power generation power plants and distribution grids are designed to supply the requirements of such motors. A wind driven power generation system must meet the same requirements if it is to contribute to the power generation capacity of a power distribution grid. Accordingly, rotation rate control is a necessity.

The rotation rate control requirement has been recognized in various United States Patents concerning wind driven electric power generators. In particular, U.S. Pat. No. 1,523,295, granted Jan. 13, 1925, to James T. Ryan, discloses a controlled speed windmill which uses a vertically disposed rotor having blades which are partially shielded in order to provide an imbalance in wind effect on the blades to turn the rotor. Ryan teaches that rotation rate control may be achieved by varying the position of the shield in response to the wind speed so that the imbalance of the wind effect on the rotor is maintained substantially constant despite variations in the speed of the wind. In particular, Ryan discloses a shield having a vane pivotally mounted thereon. The position of the shield is determined by the relative orientations of the vane and the shield and this orientation is, in turn, determined by the rotation rate of the rotor via the use of a mechanical governor mounted on the rotor and interacting with the vane.

A second requirement for windmills to be used as part of the generating system which provides electricity for a power distribution grid is large size. While the wind provides a source for a large amount of energy, this energy is distributed over a correspondingly large area of the earth's surface. For example, the net wind energy crossing an area of one square meter disposed perpendicularly to the direction of the wind is only about two kilowatts when the wind speed is 15 meters per second; that is, when the wind speed is slightly more than 30 miles per hour. Since modern power plant capacities are in the tens or hundreds of megawatts range, it is clear that even if a wind driven power generation system could capture the total energy content of the wind to which it is exposed, it would have to expose a large area to the wind to be competitive with other types of power generation systems.

The necessary size of economically feasible wind driven power plants for the generation of electric power introduces technical problems which call for qualitatively new solutions. In particular, it is not possible to build plants which are competitive with other power generating systems by merely scaling up the small wind generation systems which are known in the art. Construction means suitable for a small wind generator would require massive support structures if applied to a very large windmill so that the capital investment in such a windmill would be prohibitive.

Moreover, control systems suitable for small windmills may not be suitable for a large windmill. In particular, a mechanical governor such as that used by Ryan, U.S. Pat. No. 1,523,295, while effective for the control of moderately sized windmill, is not suitable for a windmill of the size contemplated in the present invention. The reason for this is not difficult to discern. A mechanical governor mounted directly on the rotor of a windmill and providing direct adjustment of the control means of the windmill depends for its effectiveness on a relatively high rotation rate of the rotor. Large windmills are characterized by low rotor rotation rates. For example, if the tangential speed of a point on the rotor located a distance of 15 meters from the axis of rotation thereof is 15 meters per second, that is, approximately 30 miles per hour, the rotation rate of the rotor is less than 10 revolutions per minute. A reasonably sized mechanical governor operating at such a low rotation rate is incapable of providing a force of large enough magnitude to directly actuate the large control mechanisms found in large wind driven electric power plants.

SUMMARY OF THE INVENTION

The present invention contemplates a large, wind driven electric power plant in which the major operational components, a wind energy collection assembly and a fin assembly, are individually mounted on a support assembly and connected by a connecting assembly which may be controllably adjusted to vary the coupling of the wind energy collection assembly with the wind, thereby maintaining relatively constant the rotation rate of an electric generator driven by the wind energy collection assembly despite variations in wind speed. Truss structures, positioned by support cables, are used extensively in the construction of one embodiment of the plant and canvas panels are used as part of the wind collection assembly. Unique blade snap assemblies are provided to attach the panels to support cables.

An object of this invention is to provide a wind driven power generation system which is of a sufficient size to permit its incorporation into the generating capacity of a power distribution grid.

Another object is to provide a wind driven power generation system in which individual components are mounted on a central shaft to eliminate bulky, expensive, external support structures.

It is also an object of this invention to provide a wind driven power generation system in which the construction thereof makes extensive use of light weight truss structures positioned by cables to form rigid wind interception and control components.

Another object is to provide a means of interconnecting windmill components, via a cog and gear track system, such that the connection means combines rigidity with adjustability.

It is also an object of the present invention to provide a control assembly which senses variations in the rotation rate of the wind interception assembly and generates a signal from which the rotation rate is controlled.

It is yet another object of the invention to provide unique blade snaps which permit the rapid attachment of cloth panels to support and align cables to form wind interception and control surfaces.

Other objects and advantages of the invention will be evident from the following detailed description when read in conjunction with the accompanying drawings which illustrate various embodiments of the invention, and when read in conjunction with the appended claims.

BRIEF DESCRIPTION OF THE DRAWINGS

FIG. 3 illustrates in semi-detailed form a portion of the rotor assembly of the wind driven power plant shown in FIG. 1.

FIG. 4 illustrates in semi-detailed form a portion of the shield assembly of the wind driven power plant of FIG. 1.

FIG. 5 is a partial cut away of the fin assembly including a portion of the shield assembly to illustrate the connecting assembly therebetween.

FIG. 6 is a schematic representation of the rotation rate control assembly.

FIG. 7 is an exploded view of a blade snap.

FIG. 8 is a sectional view of an assembled blade snap taken substantially along the line 8—8 of FIG. 7.

DESCRIPTION OF THE EMBODIMENT OF FIGS. 1 THROUGH 8

Figure 1:
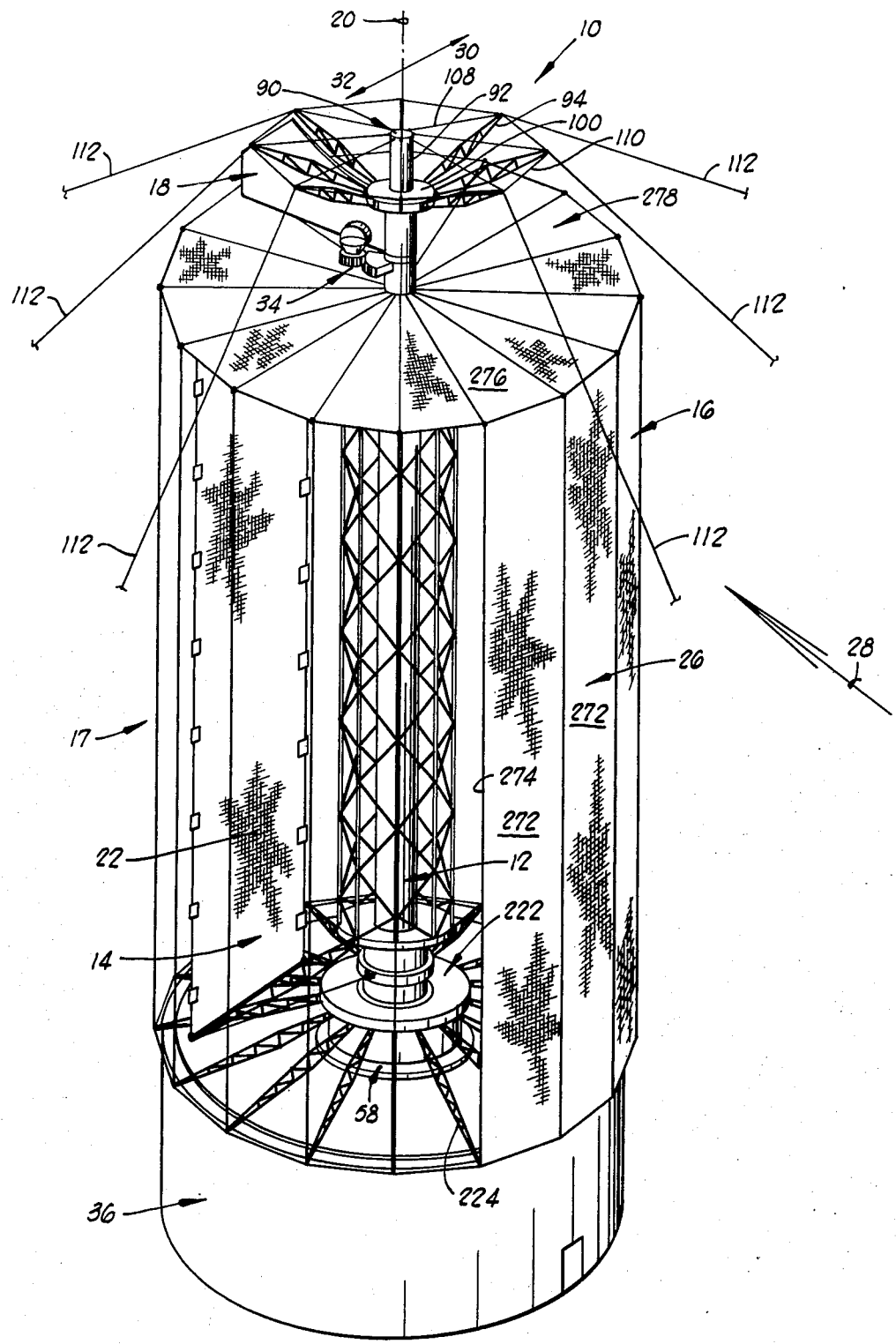
FIG. 1 shows a semi-detailed perspective view of a wind driven power plant constructed in accordance with the present invention.

Referring now to the drawings in general and to FIG. 1 in particular, shown therein and designated by the general reference number 10 is a wind driven power plant which is constructed in accordance with the present invention and which comprises: a support assembly 12, a rotor assembly 14, a shield assembly 16, and a fin assembly 18. The power plant 10 is constructed about an axis 20 which extends along a generally vertical direction, and the rotor assembly 14, the shield assembly 16, and the fin assembly 18 are supported via the support assembly 12 in such a manner that they are rotatable about the axis 20.

While a detailed description of the wind driven power plant 10 will be presented hereinbelow, it is perhaps well at this point to provide a general overview of the plant 10 with reference to FIG. 1, which is a semi-detailed perspective view. Parts of the plant 10 of FIG. 1 have not been shown in order to more clearly point out the various assemblies that are involved.

Figure 2:
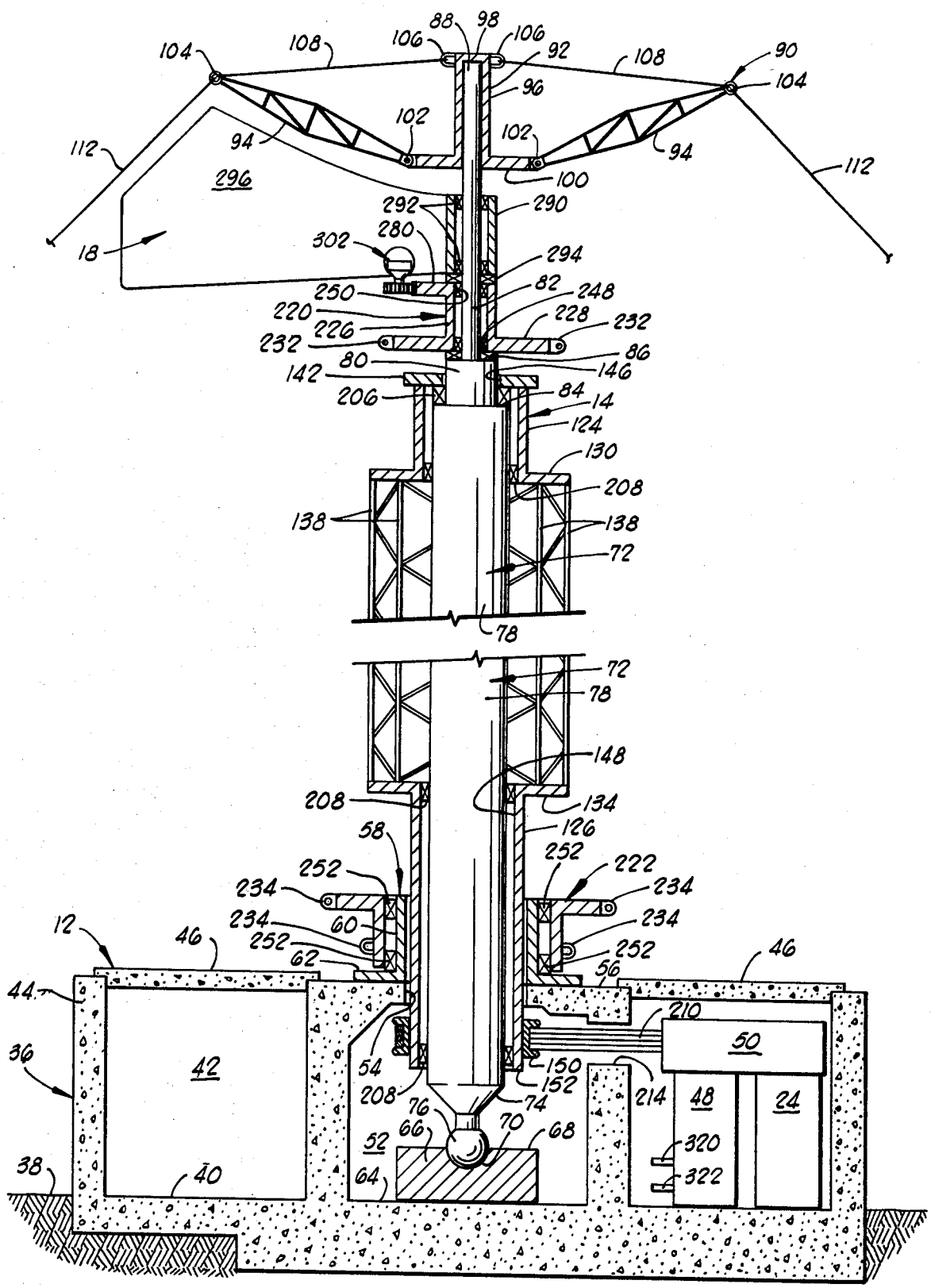
FIG. 2 is a sectional view of the support assembly of the wind driven power plant including portions of the rotor, shield and fin assemblies to illustrate the arrangement thereof on the support assembly.

The rotor assembly 14 and the shield assembly 16 coact to form a wind energy collection assembly 17 having a wind interception area that may be varied inversely with the force of the wind to drive a conventional electric generator 24, shown in FIG. 2, at a substantially constant rate. To this end, the rotor assembly 14 is disposed to rotate about the axis 20 and the shield assembly 16 is placed in a partial masking arrangement about the rotor assembly 14 so that a portion of the cross sectional area of the rotor assembly forms a wind interception area for the power plant 10. This wind interception area is varied, by controlling the angular position of the shield assembly 16 about the axis 20, to cause the rotor assembly 14 to rotate at a substantially constant rate.

The rotor assembly 14 comprises a plurality of rotor blades 22 (only one such blade 22 is shown in FIG. 1 in order to simplify the details of the drawing) which lay generally in vertical planes extending radially from the axis 20. Wind striking the blades 22 produces a torque on the rotor assembly 14 to cause the rotor assembly 14 to rotate about the axis 20 when the force effect of the wind is greater on the blades 22 disposed on one side of the support column 12 than on the rotor blades 22 disposed on the other side of the support column 12, this imbalance in wind force effect being produced by the shield assembly 16 coacting with the fin assembly 18 to partially shield the blades 22 in a manner that will be described below. A mechanical power transmission assembly connects the rotor assembly 14 to the electric power generator 24 to convert wind energy, via the rotation the wind imparts to the rotor assembly 14, into electrical energy.

The imbalance of the effect of the wind on different portions of the rotor assembly 14, necessary to cause the rotor assembly 14 to rotate about the axis 20, is provided by the shield assembly 16 which comprises a shield 26 formed partially about the periphery of the shield assembly 16, as shown in FIG. 1. The wind, blowing in the direction 28, will be deflected by the shield 26 and thereby prevented from impinging on rotor blades extending generally in the direction 30 from the axis 20. Rotor blades extending generally in the direction 32 are exposed to the wind with the result that the wind exerts a net torque on the rotor assembly 14 to rotate the rotor assembly 14 in a clockwise direction as viewed from above the wind driven power plant 10.

In order to relate the positioning of the shield 26 to the direction of the wind, the power plant 10 is provided with the fin assembly 18 which acts as an anchor on the wind; the force exerted by the wind on the fin assembly 18 being such to align the fin assembly 18 with respect to the wind direction 28.

A connecting assembly 34, connecting the shield assembly 16 to the fin assembly 18 is provided to position the shield assembly 16 with respect to the fin assembly 18 so that the shield assembly 16 is positioned with respect to the wind direction 28 rather than with respect to true geographical directions. As will be explained more fully below, the connecting assembly 34 is controllably adjustable in response to the rotational speed of the rotor assembly 14 as effectuated by the action of the wind force exerted on the blades 22 in a manner that the rotation rate of the rotor assembly 18 is controlled at a substantially constant rate.

It will be recognized by one skilled in the art that other means of providing an anchor on the wind, against which the shield assembly may be adjusted, could be employed in the wind driven power plant 10. For example, a structure supported by the support assembly 12 in a concentric relation about the axis 20 and positioned by a servomotor controlled by a wind direction sensor could be used to support portions of the connecting assembly 34 and provide such an anchor without departing from the concept of the present invention.

Turning now to the support assembly 12, FIG. 2 is provided to show the support asssembly in partial cross sectional view. Portions of the rotor assembly 14, the shield assembly 16 and the fin assembly 18 have been included in FIG. 2 to illustrate the assembly of the wind driven power plant 10.

The support assembly 12 comprises a support base 36 formed on and partially below the earth's surface 38. A portion of the support base 36 extends substantially parallel to the earth's surface 38 to form a floor 40 for a control room 42. A cylindrically shaped barrier 44, formed integrally with the support base 36, forms the walls of the control room 42. A slab roof 46 is provided for the control room 42. Contained within the control room 42 is the power generator 24, a rotation rate control system 48, and a speed increaser 50. As will be understood by one skilled in the art, the rotation rate of a large rotor driven by the wind must necessarily be quite low; for example, a tangential speed of 30 miles per hour for a point on the rotor assembly 14 located a distance of 50 feet from the axis of rotation 20 corresponds to a rotation rate of less than 10 revolutions per minute. The speed increaser 50 is a conventional gear train which drives the generator 24 and the rotation rate control system 48 at a high rotation rate, necessary for the control of the power plant 10 and for the generation of electric power, when the speed increaser is driven at the low rotation rate provided by the effect of the wind on the rotor assembly 14. The speed increaser 50 and the generator 24 are of conventional design and accordingly, they have been drawn schematically. Similarly, the rotation rate control system 48, which will be described in more detail below, is an assembly of conventional components and has been drawn schematically in FIG. 2.

A cylindrically shaped cavity 52 is formed in the support base 36 generally concentrically with the axis 20 of the wind driven power plant 10. An opening 54, formed generally concentrically with the axis 20, provides communication between the cavity 52 and the upper surface 56 of the support base 36.

A bearing block 58 is secured to the upper surface 56 of the support base 36 to provide a portion of the means for mounting the shield assembly 16 on the support assembly 12. The bearing block 58 comprises a cylindrical bearing sleeve 60 that is arranged concentrically with the axis 20. The bearing sleeve 60 has a flange 62 which is bolted or otherwise secured to the upper surface 56 of the support base 36. As will be discussed hereinbelow, the sleeve 60 serves to partially support the shield assembly 16 for rotation about the axis 20.

The cavity 52 has a floor 64, and a main bearing 66 is boltingly mounted thereon. The main bearing 66 is circular in transverse cross section and is secured to to the cavity floor 64 by conventional bolting means in a position such that the axis of the main bearing 66 coincides with the axis 20 of the wind driven power plant 10. The main bearing 66 has an upper surface 68 and a generally spherically shaped socket 70 is formed therein so that the center of the spherical socket 70 lays on the axis 20 of the wind driven power plant 10.

The socket 70 provides a means for pivotally mounting a central shaft 72 that extends generally vertically and coaxially with the axis 20. The central shaft 72 is terminated at its lower end 74 with a support ball 76 which fits within the socket 70 and which bears the weight of the central shaft 72 and other components to be described below. The central shaft 72 comprises three portions: a main portion 78, a first upper portion 80, and a second upper portion 82. The diameter of the first upper portion 80 of the central shaft 72 is smaller than the diameter of the main portion 78 thereof, and a rotor support shoulder 84 is formed between the main portion 78 and the first upper portion 80 of the central shaft 72. As its name implies, the purpose of the rotor support shoulder 84 is to provide a means to rotatingly support the rotor assembly 14 on the central shaft 72 in a manner that will be made clear below.

The second upper portion 82 of the central shaft 72 has a smaller diameter than the first upper portion 80 and a shield support shoulder 86 is formed between the first and second upper portions 80 and 82 of the central shaft 72. As its name implies, the shield support shoulder 86 provides a means for rotatingly supporting portions of the shield assembly 16 on the central shaft 72 in a manner that will be made clear below.

At the upper end 88 of the central shaft 72, the support assembly 12 further comprises a vertical position support bonnet 90 which includes a bonnet hub 92 and a plurality of bonnet arms 94. As shown in FIG. 1, the preferred embodiment of the present invention incorporates a total of eight identical bonnet arms 94 (only one arm has been numbered in FIG. 1 to avoid confusing the drawing). However, it will be recognized that any number of bonnet arms 94 could be used without departing from the concept of the present invention. The bonnet hub 92 includes a bonnet hub tube 96 that has a cylindrically shaped cavity sized to receive the upper end 88 of the central shaft 72, and the end 98 of the bonnet hub tube 96 is solid so that is retained on the upper end 88 in the manner shown in FIG. 2. At its lower end, the bonnet hub 92 has a flange 100 that extends about the periphery of the bonnet hub tube 96. The internal diameter of the bonnet hub tube 96 is slightly larger than the diameter of the second upper portion 82 of the central shaft 72 so that the bonnet hub tube 96 may be used to cap the central shaft 72, with the upper end 88 of the central shaft 72 in contact with the end 98 of the bonnet hub tube 96.

Truss structures are used extensively in the preferred embodiment of the wind driven power plant 10 in order to minimize the weight and construction cost of the plant. As used herein, the term "truss structure" refers to a combination of beams, bars or ties arranged in a triangle or series of triangles to form a rigid framework, such as that shown in the make up of the bonnet arms 94 in FIGS. 1 and 2. With this definition, it will be sufficient for the present disclosure to refer to certain members as being truss structures, and it will be so understood thereby that such members are so constructed, with no further need to designate each individual beam, bar or tie member that forms the truss structure. Steel cables or the like are used to interconnect the truss structures to combine them into rigid assemblies.

Referring once more to FIG. 2, it will be noted that each bonnet arm 94 is a truss structure having an overall elongated diamond shape in the manner of a crane arm. A yoke member 102 is welded to the flange 100 for each of the bonnet arms 94, and each bonnet arm is pivotally connected to one of the yoke members 102 via conventional bolting means. The bonnet arms 94 extend radially away from the bonnet hub 92, and the distal end of each of the bonnet arms 94 is provided with a cable fastening loop 104 such as a ring or the like. A similar cable fastening loop 106 is attached to the bonnet hub 92 near the end 98 for each of the bonnet arms and cables 108 are attached to and extend between the loops 104 and 106 associated with each bonnet arm 94. Cables 110, shown in FIG. 1 (only one cable 108 and one cable 110 have been numbered in FIG. 1 to avoid confusing the drawing), are attached to and extend between loops 104 on adjacent bonnet arms 94 and the cables 108 and 110 cooperate to position the bonnet arms 94 such that the bonnet 90 is a rigid structure symmetric with respect to the axis 20.

The vertical position support bonnet 90 serves to position the central shaft 72 along the vertical axis 20 and, for this purpose, anchor cables 112 extend from the cable fastener loops 104 on the bonnet arms 94 to suitable ground anchors (not shown) arranged about the wind driven power plant 10. Conventional turnbuckles (not shown) disposed along the anchor cables 112 provide a means for properly establishing and maintaining the vertical alignment of the central shaft 72.

The support assembly 12 is provided with the support bonnet 90 in order to make maximum use of the central shaft 72 for the controlled generation of electric power. Were the anchor cables 112 fastened directly to the central shaft 72, the central shaft 72 would have to extend further upwardly in order to provide clearance between the anchor cables 112 and the fin assembly 18, or alternatively, the shield assembly 16 and the rotor assembly 14 would have to be compacted to allow clearance for the fin assembly 18. As opposed to either of these alternatives, the cost of the central shaft 72 of the present invention is decreased by the decreased length required of the central shaft 72 because of the manner of connecting the anchor cables 112 to the central shaft 72 via the vertical position support bonnet 90.

The rotor assembly 14 of the preferred embodiment is illustrated in FIG. 3. Although a plurality of rotor blades 22 is contemplated, the semi-detailed view of FIG. 3 has been simplified by removing all of the rotor blades 22 except one in order to present a more comprehensive view of the construction of the rotor assembly 14. It will be understood that the rotor blades 22 that are not shown are of identical construction and are spaced equally about the rotor assembly 14.

The rotor assembly 14 comprises a central rotor structure 120 with the blades 22 extending radially therefrom. The central rotor structure 120 is constructed concentrically about a central axis 122 which, when the rotor assembly 14 is mounted on the support structure 12, is coincident with the axis 20 of the wind driven power plant 10. The central rotor structure 120 comprises an upper rotor sleeve 124 and a lower rotor sleeve 126, both of which are concentric about the axis 122 and which are held in spaced-apart relation by a central truss structure 128 connected therebetween. The upper rotor sleeve 124 has a flange 130 connected to its lower end 132 and the lower rotor sleeve 126 has a flange 134 connected to its upper end 136. The truss structure 128 comprises a plurality of longitudinal members 138 that are connected to the flanges 130 and 134, and a plurality of cross brace members 140 that interconnect between adjacent longitudinal members 138 in a manner to form a truss structure.

A rotor bearing plate 142 is connected to the upper end 144 of the upper rotor sleeve 124, the purpose of the rotor bearing plate 142 being to provide support for the rotor assembly 14 on the central shaft 72 of the support assembly 12. Accordingly, the internal diameter of the bore that extends through the upper rotor sleeve 124 and the internal diameter of the bore that extends through the lower rotor sleeve 126 are sized to clearingly receive the main portion 78 of the central shaft 72, and the rotor bearing plate 142 has a bore 146 that is concentric about the axis 122. The diameter of the bore 146 is sized to clearingly receive the first upper portion 80 of the central shaft 72, and the diameter of the bore 146 is smaller than the diameter of the main portion 78 of the central shaft 72 so that the rotor bearing plate 142 is supportable on the rotor support shoulder 84, as shown in FIG. 2, as will be discussed further hereinbelow. The flange 134 has a bore 148 that is concentric about the axis 122 and which is sized to clearingly receive the main portion 78 of the central shaft 72, as also depicted in FIG. 2.

With continuing reference to FIG. 3, it will be noted that a sheave 150 is fixed on the lower sleeve 126 near the lower end 152 thereof. The lower sleeve 126 provides a power take off member for the wind driven power plant 10 and the purpose of the sheave 150, as will be made clear below, is to provide means for a power transmission from the rotation of the rotor assembly 14 in an operating mode of the wind driven power plant 10. Such rotation is effected by the controlled exposure to the wind of the rotor blades 22, the construction of which will now be described.

As illustrated in FIG. 3, each rotor blade 22 comprises an upper rotor arm 160 pivotally attached via a yoke 162 to the upper rotor sleeve flange 130, and each rotor blade 22 comprises a lower rotor arm 164 pivotally attached via a yoke 166 to the lower rotor sleeve flange 134. It will, of course, be understood that a plurality of yokes 162 are symmetrically spaced about and connected to the periphery of the upper rotor sleeve flange 130, and a plurality of yokes 166 are symmetrically spaced about and connected to the periphery of the lower rotor sleeve flange 134 to provide attachment means for each of the rotor blades 22. Since the yokes 162, 166 are identical for all blades, only one set of yokes 162, 166 are shown in FIG. 3.

The upper rotor arm 160 and the lower rotor arm 164 are truss structures, each rotor arm 160, 164 having an elongated diamond shape in the manner of the previously described bonnet arms 94 of the vertical position support bonnet 90. The upper rotor arm 160 has a distal end 168 to which is attached a loop connector 170, and the lower rotor arm 164 has a distal end 172 to which is attached a loop connector 174.

Each rotor blade 22 is formed into a rigid structure by a network of cables. In order to provide means for attaching the network of cables to the central structure 120, a plurality of cable fasteners are provided on the central structure 120. In particular, the cable fasteners on the central structure 120 comprise a plurality of connectors 176 symmetrically spaced about and connected to the periphery of the rotor bearing plate 142, only one of the connectors 176 being shown in FIG. 3 in keeping with the above stated simplification of that figure. Also, a collar 178 is mounted on the lower rotor sleeve 126 near the mid-point thereof, and a plurality of connectors 180 are symmetrically spaced about and connected to the periphery of the collar 178 (only one of the connectors 180 is shown in FIG. 3). The rotor blade 22 is formed into a rigid structure laying substantially in a plane extending radially from the axis 122 of the rotor assembly 14 by means of an upper blade support cable 182 that extends between the connector 176 on the rotor bearing plate 142 and the connector 170 at the extensive end 168 of the upper rotor arm 160; an outer sail support cable 184 that extends between the connector 170 and the connector 174 located at the extensive end 172 of the lower rotor arm 164; and a lower blade support cable 186 that extends between the connector 174 and the connector 180 located on the collar 178.

Each blade 22 is completed by forming a network of sail support cables, one of which is the outer sail support cable 184, between the rotor arms 160, 164 and attaching a sail 188 thereto. To provide means of attaching the network of sail support cables to the rotor arms 160, 164, a connector 190 is attached to the lower surface 192 of an upper rotor arm 160 near the mid-point thereof and a connector 194 is attached to the upper surface 196 of the lower rotor arm 164 near the mid-point thereof. An inner sail support cable 198 is attached to the connector 190 on the lower surface 192 of the upper rotor arm 160 and extends therefrom, and is attached to the connector 194 on the upper surface 196 of the lower rotor arm 164. An upper sail support cable 200 is attached to the connector 190 on the lower surface 192 of the upper rotor arm 160 and extends along the surface 192 and is attached to the connector 170 at the extensive end 168 of the upper rotor arm 160. A lower sail support cable 202 is attached to the connector 194 on the upper surface 196 of the lower rotor arm 164 and extends along the surface 196 and is attached to the connector 174 located at the extensive end 172 of the lower rotor arm 164. The network of sail support cables thus described can be connected to the described connectors in a conventional manner.

In keeping with the objectives of minimizing weight and affording rapid installation, the sail 188 is a silicone treated canvas panel previously sized to fit within the network of sail support cables 184, 198, 200 and 202. The sail 188 is connected to the sail support cables 184, 198, 200 and 202 by a plurality of unique blade snaps 204, also referred to herein as panel attachment means, that will be described in detail hereinbelow.

The rotor blades 22 are held in symmetric spaced-apart relation about the axis 122 of the rotor assembly 14 by the use of cables (not shown) that are attached to and extend between the connectors 170 on the extensive ends 168 of adjacent upper rotor arms 160 and by cables (not shown) that are attached to and extend between connectors 174 at the extensive ends 172 of adjacent lower rotor arms 164. Other bracing cables (not shown) can be used to provide additional strength to the rotor assembly 14, such cables extending from the upper rotor arm 160 of each blade 22 to the lower rotor arm 164 of the adjacent blade 22; for example, additional bracing cables may be attached to the rotor arms 160, 164 at the connectors 170 located at the extensive end 168 of each upper rotor arm 160 and at the connectors 174 located at the extensive end 172 of each lower rotor arm 164.

As illustrated in FIG. 2, the rotor assembly 14 is assembled as a component part of the wind driven power plant 10 by placing the rotor assembly 14 over the central shaft 72, the rotor bearing plate 142 rotatably supported by the rotor support shoulder 84. A conventional bearing means 206 is positioned between the rotor bearing plate 142 and the rotor support shoulder 84 so that the rotor assembly 14 will freely rotate about the central shaft 72. Of course, it will be recognized that the axis 122 of the rotor assembly 14 will be coincident with the axis 20 of the central shaft 72 in this assembled mode, and to assure that this alignment is maintained at all times, similar spacer bearings 208 are mounted at selected intervals between the main portion 78 of the central shaft 72 and the rotor sleeves 124, 126.

As illustrated in FIG. 2, the lower rotor sleeve 126 extends through the opening 54 in the support base 36 and into the cavity 52 formed therein. The sheave 150 that is affixed to the lower rotor sleeve 126 is thus positioned within the cavity 52 and is concentric with the axis 20 of the rotor electric power plant 10. A power transmission means 210 which, in this embodiment, is a belt, contacts and is driven by the sheave 150 to transmit power from the rotor assembly 14 to the speed increaser 50. An opening 214 in the support base 36 serves as a passage between the cavity 52 and the control room 42, and the transmission belt 210 extends therethrough. Although a transmission belt 210 is depicted in FIG. 2, it will be recognized that other transmission systems can be utilized without departing from the concept of the present invention.

The shield assembly 16 is partially illustrated in FIG. 4, which is a semi-detailed depiction of the shield assembly 16, as it is believed a simplified view best will illustrate the details of construction. The shield assembly 16 comprises an upper shield structure 220 and a lower shield structure 222, each provided with a plurality of radially extending shield support arms 224, in the same manner that the rotor assembly 14 is provided with radially extending rotor arms 160, 164. As is the case with the rotor arms 160, 164 of the rotor assembly 14, each shield support arm 224 incorporated in the shield assembly 16 is identical both in structure and mounting means to each other shield support arm 224 so that a description of one shield support arm 224 will provide an understanding of all of the shield support arms 224. For this reason, only four of the shield support arms 224 are shown in FIG. 4 as such will illustrate the details of construction and their mode of cooperation. It will be understood that the preferred embodiment incorporates a plurality of shield support arms 224 extending radially from the shield structures 220, 222, and that each shield support arm 224 not shown is provided with the same attachment and alignment hardware used in conjunction with the arms 224 illustrated in FIG. 4.

The upper shield structure 220 comprises an upper shield sleeve 226 having an upper shield sleeve flange 228 at its lower end 230. A plurality of yokes 232 are attached to and spaced about the periphery of the upper shield flange 228, and one of the shield support arms 224 is pivotally connected to each such yoke 232. A plurality of loop connectors 234 are attached to the upper shield sleeve 226 in a symmetric arrangement thereabout, with one such connector 234 disposed above one of the yokes 232. The connectors 234 serve as the means for attaching cables used to support and align the shield support arms 224 which extend from the upper shield structure 220.

The lower shield structure 222 comprises a lower shield sleeve 236 having a lower shield sleeve flange 238 at the upper end 240 thereof. A plurality of yokes 232 are symmetrically spaced about the lower sleeve flange 238 for pivotal attachment of the shield support arms 224 thereon, and a plurality of loop connectors 234 are symmetrically spaced about the lower shield sleeve 236 in the manner described above for the upper shield structure 220.

The upper shield structure 220 has a bore 242 extending the length of the upper shield sleeve 226, the bore 242 having an internal diameter sized to clearingly receive the second upper portion 82 of the central shaft 72 but sized not to received the first upper portion 80 of the central shaft 72. In like manner, a bore 244 extends through the lower shield sleeve 236 of the lower shield structure 222. The internal diameter of the bore 244 is sized to clearingly receive the sleeve 60 of the bearing block 58. The bores 242 and 244 are each concentric about an axis 246 in FIG. 4 which becomes coincident with the axis 20 when the shield structures 220, 222 are mounted onto the central shaft 72 as shown in FIG. 2. When so mounted, the upper shield structure 220 is supported via a bearing 248 positioned between the upper shield structure 220 and the shield support shoulder 86. The upper shield sleeve 226 is further provided with a spacer bearing 250 which is spaced-apart from the bearing 248 and coacts therewith to rotatably align the upper shield structure 220 concentrically about the axis 20 of the wind driven power plant 10.

The lower shield structure 222 is concentrically mounted about the bearing block 58 on the upper surface 56 of the support base 36 and is rotatably supported thereon by bearings 252. The bearings 252 are constructed and mounted in such a manner that the lower shield structure 222 can rotate about the bearing block 58 but cannot move longitudinally along the bearing block 58 so that no central connecting structure between the upper and lower shield structures 220, 222 is required in order to maintain the spacing between the upper and lower shield structures 220, 222 when they are mounted on the support assembly 12. Bearing assemblies of this type are well-known and further description is not necessary for the present disclosure.

Returning to the description of the shield assembly 16 with reference to FIG. 4, it will be noted that the shield support arms 224 are pivotally attached to, and extensive from the upper and lower shield structures 220, 222. The shield arms 224 are truss structures that have an overall elongated diamond shape in the manner of a crane arm and are of greater length than the length of the rotor arms 160, 164 so that the shield 26, formed with the shield arms 224, will selectively enclose the rotor assembly 14 as described more fully below.

Each shield support arm 224 is provided with a loop connector 254 at its extensive end to provide a means of attaching cables which position the shield support arms 224 and provide a means for mounting the shield 26 on the shield support arms 224. A shield arm positioning cable 256 is attached to and extends from the connector 254 of each of the shield support arms 224 and terminates at and is attached to one of the connectors 234 attached to the upper and lower shield structures 220, 222 as shown in FIG. 4. A vertical shield support cable 258 is attached to the connector 254 of each of the shield support arms 224 that are extensive from the upper shield structure 220, the vertical shield support cable 258 extending to the connector 254 of the shield support arm 224 supported immediately below by the lower shield structure 222. An upper support shield cable 260 is attached to and extends between the connectors 254 of adjacent shield support arms 224 that extend from the upper shield structure 220, and a lower shield support cable 262 is attached to and extends between the connectors 254 of adjacent shield support arms 224 that extend from the lower shield structure 222. Cross cables 264 are connected as shown between the connectors 254 of the adjacent shield support arms 224.

Similarly positioned cables as above described for the cables 256, 258, 260, 262 and 264 are also connected to shield support arms 224 that have not been illustrated, so that the totality of the shield support arms 224 extending from the upper shield structure 220 are formed into a symmetric structure about the axis 246 and the totality of arms 224 extending from the lower shield structure 222 are formed into a symmetric structure about the axis 246 of the shield assembly 16, the axis 246 being coincident with the axis 20 of the power plant 10 in its assembled mode. These symmetrical structures are formed into the rigid shield assembly 16, as shown in FIG. 1, by adjusting the tension in each of the various cables by means of interposed turnbuckles (not shown) or the like.

As shown in FIG. 4, the adjacent vertical shield support cables 258 and the upper and lower shield support cables 260, 262 define a rectangle 270, the corners of which are located at the extensive ends of the upper and lower shield support arms 224. Similar rectangles 270 are formed by cables attached to each pair of the adjacent shield support arms 224 not illustrated. The shield 26 is formed by covering selected rectangles 270 with silicone treated canvas panels 272 which are attached to the vertical shield support cables 258 and upper and lower shield support cables 260, 262 by means of the blade snaps 204 that were discussed above for the sail 188 and which blade snaps are to be described in detail herebelow. The panels 272 may be viewed in FIG. 1, but are not shown in FIG. 4 in order to more fully illustrate the cable structures therein.

In order that the shield 26 may accomplish its function of deflecting wind which would otherwise impinge on blades 22 extending generally in the direction 30 from the axis 20, while partially exposing blades 22 extending generally in the direction 32 therefrom, only about one half of the rectangles 270 about the shield assembly 16 are provided with the panels 272. The selection of rectangles 270 for paneling is determined in accordance with the function of the shield assembly 16. Referring to FIG. 1, it is shown therein that the rectangles 270 which have been provided with panels 272 define a leading edge 274 of the shield 26. The leading edge 274 is disposed a distance, generally in the direction 32, to one side of a plane passing through the axis 20 in the direction 28 so that the blades 22 extending in the direction 30 are masked from the wind, while the blades 22 extending in the direction 32 are partially exposed to the wind. The rotation rate of the rotor assembly 14 is controlled by adjusting the position of the shield 26 to increase or decrease the distance by which the leading edge 274 is disposed in the direction 32, thereby decreasing or increasing the exposure of the blades 22 extending in the direction 32. It will be clear to one skilled in the art that a maximum imbalance of the wind force effect on the rotor assembly 14 will occur when the leading edge 274 lays in the plane passing through the axis 20 in the direction 28. Should the leading edge 274 be disposed in the direction 32 from this plane, partial masking of the blades 22 extending in that direction will occur to decrease the wind force effect on rotor assembly 14; should the leading edge 274 be disposed in the direction 30 from this plane, partial exposure of the blades 22 extending in the direction 30 will occur, resulting in a torque on the rotor assembly 14 which opposes the torque produced by the wind force effect on the blades 22 extending in the direction 32. Thus, the choice of the rectangles 270 which are provided with the panels 272 is such that the leading edge 274 of the shield 26 will lay in the plane passing through the axis 20 in the direction 28 when the connecting assembly 34 between the shield assembly 16 and the fin assembly 18 is in a configuration corresponding to one extreme of its range adjustment. As will be discussed more fully below, a limit switch (not shown) fixes this extreme.

In like manner, silicone treated canvas panels 276 are attached to adjacent shield support cables 256 extensive from the upper shield structure 220 by the use of the blade snaps 204 to form a roof portion 278 of the shield assembly 16 for the wind driven power plant 10, as shown in FIG. 1 (to avoid confusing FIG. 1, only one panel 276 has been so numbered therein).

To provide for the positioning of the shield assembly 16 about the axis 20 of the rotor electric power plant 10, a gear track flange 280 is formed concentrically at the upper end 282 of the upper shield sleeve 226 of the upper shield structure 220, as shown in FIG. 4. The gear track flange 280 is part of the adjustable connecting assembly 34 and has a gear track 284 with a plurality of gear teeth 286 formed along the periphery of the gear track flange 280 to provide a means of establishing and selectively varying the connection between the shield assembly 16 and the fin assembly 18 in a manner and for a purpose that will be made clear below.

The fin assembly 18 is shown in partial cut away view in FIG. 5, and comprises a fin sleeve 290 that is rotatably mounted on the second upper portion 82 of the central shaft 72 immediately above the upper shield structure 220 of the shield assembly 16, as is best viewed in FIG. 2. Suitable bearings 292 are mounted in supporting engagement between the fin sleeve 290 and the central shaft 72 to facilitate free rotational movement of the fin assembly 18. A bearing 294 is mounted on the central shaft 72 and is positioned between the upper shield sleeve 226 and the fin sleeve 290 to support the fin assembly 18 while permitting free rotation of the fin assembly 18 relative to the shield assembly 16.

Returning to FIG. 5, the fin assembly also comprises a fin 296 that is a truss structure 298 that is rigidly attached to the fin sleeve 290 and covered on both sides by a skin 300 made of sheet metal or the like. The skin 300 is attached to the truss structure 298 by any suitable means such as, for example, by rivets.

The fin assembly 18 further comprises a motorized gear drive 302, of conventional design, which supports a cog 304 having gear teeth 306. The gear drive 302 is supported by the fin 296 and is spatially positioned so that the cog 304 engages the gear track 284 of the shield assembly 16. That is, the gear teeth 306 mesh with the gear teeth 286 of the gear track 284. The motorized gear drive 302 and the cog 304 form a driving portion of the connecting assembly 34 and the gear track 284 forms a driven portion thereof so that the cog 304 and the gear track 284 adjustably connect the fin assembly 18 to the shield assembly 16. Although, in the preferred embodiment of the present invention, the connecting assembly 34 comprises a cog 304 mounted, via the motorized gear drive 302, on the fin assembly 18 and a gear track 284 mounted on the shield assembly 16, variations in the structure of the connecting assembly 34 may be made without departing from the concept of the present invention. In particular, the driving portion could be mounted on the shield assembly 16 with the driven portion being mounted on the fin assembly 18. Similarly, the connecting assembly 34 could employ a pair of sheaves, one drivingly supported by the motorized gear drive 302 on the fin assembly 18 and one attached to the shield assembly 16, connected by a drive belt.

The gear drive 302 has a reversible electric motor 308 that selectively drives the cog 304 in a rotational direction so as to move the cog 304 along the gear track 284 to adjust the position of the fin 296 relative to the gear track flange 280 of the shield assembly 16. The electrical wires and the power supply connected to the electric motor 308 to provide energy for driving the motor 308 are not shown as these are conventional, and the control means for selectively rotating the cog 304 will be discussed below. Also limit switches (not shown) are mounted on the gear track 284 to interrupt the supply of electrical power to the gear drive 302 when the cog 304 reaches either extreme position of a preselected range of travel on the gear track 284.

It will be clear to one skilled in the art that, since the fin 296 aligns itself along the direction 28, the shield assembly 16 is positioned relative to the wind by the configuration of the connecting assembly 34; that is, by the location of the cog 304 on the gear track 284. Thus, the limit switches (not shown) may be positioned on a gear track 284 to fix the extreme dispositions of the leading edge 274 of the shield 26 in the direction 32 to one side of a plane passing through the axis 20 in the direction 28. In particular, one limit switch is positioned on the gear track 284 so that, in one extreme disposition of the shield 26, the leading edge 274 thereof is positioned within a plane passing through the axis 20 in the direction 28, resulting in maximum exposure of the blades 22 extending in the direction 32. A second limit switch (not shown) is positioned on the gear track 284 so that, in a second extreme disposition of the shield 26, the shield 26 completely masks the blades 22 extending in both directions 30, 32 resulting in no exposure of the blades 22 to the effect of the wind.

The use of limit switches in this manner to define the extreme dispositions of the shield 26 is in keeping with the overall concept of flexibility in design of the rotor electric power plant 10. Rather than determine anew the geometrical relationship between the shield assembly 16 and the fin assembly 18 when the construction of the rotor electric power plant 10 is varied, for example, in size, to take advantage of the prevailing wind conditions at the site of the plant, the relative orientations of the fin assembly 18 and the shield assembly 16 are adjusted in situ by the positioning of the limit switches (not shown).

The gear drive 302 can be actuated to turn the cog 304 in a clockwise direction as viewed from above the wind driven power plant 10 or in a counterclockwise direction, with the result in either case that the cog 304 will move along the gear track 284 to adjust the relative orientation of the fin assembly 18 and the shield assembly 16 about the central shaft 72 of the support assembly 12. The direction in which the fin 296 will extend from the shaft 72 is determined by the direction of the wind, and consequently, any change in the relative orientation of the shield assembly 16 to the fin assembly 18 is accomplished by the rotation of the shield assembly 16 about the shaft 72. In particular, when the gear drive 302 is actuated to turn the cog 304 in a clockwise direction, the shield assembly is turned in a counterclockwise direction about the shaft 72. This results in an increased exposure of the rotor blades 22 to the wind, which increases the effect of the wind on the rotor assembly 14. As more of the rotor assembly 14 is exposed to the wind, the rotational rate of the rotor assembly 14 increases. Conversely, when the gear drive 302 is actuated to turn the cog 304 in a counterclockwise direction, the shield assembly 16 is turned in a clockwise direction, which serves to increase the masking of the blades 22 from the wind, thereby decreasing the effect of the wind on the rotor assembly 14 and decreasing the rotational rate thereof.

The gear drive 302 is actuated to turn the cog 302 in either direction by a shield positioning signal supplied by the rotation rate control system 48 shown as a block in FIG. 2. The hydraulic and electrical circuits of the rotation rate control system 48, which is constructed of conventional components, is shown in FIG. 6. In particular, the rotation rate control system 48 incorporates a high pressure switch 320 which, when closed, transmits an electrical signal from an electrical power source (not shown) to the gear drive 302, via conventional slip rings (not shown) on the rotor assembly 14 and an electrical conduit (not shown). The reversible electric motor 308, when actuated via the high pressure switch 320, is supplied with power to cause the gear drive 302 to turn the cog 304 in a direction to move the gear track 284 in the clockwise direction, as viewed from the top of the shield assembly 16. This results in the rotation of the shield assembly 16 to increase the masking of blades 22 extending in the direction 32, thereby decreasing the effect of the wind on the rotor assembly 14 to decrease the rotation rate thereof.

Similarly, the rotation rate control system 48 incorporates a low pressure switch 322 which, via slip rings (not shown) and electrical conduits (not shown), transmits an electrical signal to the gear drive 302 to drive the cog 304 in a direction to move the gear track 284 in the counterclockwise direction, as viewed from the top of the shield assembly 16. Thus the cog 304, coacting with the gear track 284, adjusts the shield assembly 16 to increase the effect of the wind on the rotor assembly 14, thereby increasing the rotation rate thereof.

Actuation of the high pressure switch 320 and the low pressure switch 322, in response to increases or decreases in the rotation rate of the rotor assembly 14, is accomplished by the rotation rate control system 48 which will now be described.

The rotation rate control system 48 comprises, in general, a hydraulic circuit 309 illustrated by a block diagram in FIG. 6, and includes a hydraulic pump 310 which is driven via any suitable connecting means by the speed increaser 50. The pump 310 is of the positive displacement type, that is, of the type which delivers a fixed amount of hydraulic fluid per pumping cycle. Such pumps are of conventional design and may be obtained from a number of manufacturers. Since the pump 310 delivers a fixed amount of fluid per pumping cycle, its pumping rate is a measure of the rate at which the pump 310 is driven; that is, because of the interconnection between the pump 310 and the rotor assembly 14 via the speed increase 50, the pumping rate is a measure of the rotation rate of the rotor assembly 14.

The inlet of the pump 310 is connected to and in fluidic communication with a reservoir 314 and the pump 310 exhaust is connected to and in fluidic communication with pressure tank 316 so that the pump 310 draws hydraulic fluid from the reservoir 314 and discharges it into the pressure tank 316. The pressure tank 316 is in fluidic communication with the reservoir 314 via a manual set orifice 318 to complete the hydraulic circuit. The manual set orifice 318 is of conventional design and is analogous to a fixed resistor in an electrical circuit in that the fluid flow rate through the orifice 318 is functionally related to the pressure differential thereacross; in particular, the pressure differential across the orifice 318 must increase for an increase in the fluid flow rate therethrough. The manual set orifice 318 empties into the reservoir 314 through hydraulic lines which are of sufficient dimensions to offer little resistance to fluid flow; whereby the fluidic pressure on the exhaust side of the orifice 318 is substantially independent of the flow rate therethrough. Accordingly, an increase in the pressure differential across the orifice 316 must be effectuated by an increase in the absolute fluidic pressure on the inlet side of the orifice 318; that is, by an increase in the absolute fluidic pressure in the pressure tank 316. Thus, the manual set orifice 318 converts fluid flow rates in the hydraulic circuit to absolute pressure values in the pressure tank 316. It is to effect this conversion that the pump 310 is of the positive displacement type. A pump of this type establishes, at its exhaust, whatever pressure is dictated, by the hydraulic circuit in which the pump is used, for the pump to transfer a fixed quantity of fluid per cycle. Thus, as the rotation rate of the rotor assembly 14 increases, the pump 310 cycles at a faster rate whereby the fluid flow rate in the hydraulic circuit increases. In order to effectuate the increased flow rate, the pump 310 must simultaneously establish an increased pressure in the pressure tank 316 in order to provide the increased pressure differential across the orifice 318 corresponding to the increased fluid flow rate. Similarly, should the rotation rate of the rotor assembly 14 decrease, the pump 310 will establish a corresponding decreased absolute fluid pressure in the pressure tank 316.

The high pressure switch 320 and the low pressure switch 322, previously dicussed in connection with the actuation of the gear drive 302 are fluid pressure actuated electrical switches which are of conventional design and which are disposed in fluid communication with the pressure tank 316. The high pressure switch 320 is of the normally open type; that is, the pressure in the tank 316 must rise to a preselected value for the switching members in the high pressure switch 320 to make electrical contact. The low pressure switch 322, on the other hand, is of the normally closed type; that is, the switching members of the low pressure switch 322 make electrical contact when the pressure in the pressure tank 316 falls below a preselected value.

Although the control of the rotation rate of the rotor assembly 14 will be understood by one skilled in the art from the above description of the rotation rate control system 48, a brief description of the control process will further serve to clarify the precise manner in which the rotation rate control is achieved. When the rotation rate is within the range of values selected for the operation of the rotor assembly 14, the pumping rate of the pump 310 will be such to establish an absolute fluid pressure within the pressure tank 316 such that the low pressure switch 322 will have been actuated but the high pressure switch 320 will not have been actuated. Since the low pressure switch 322 is of the normally closed type, its actuation interrupts electrical contact between its electrical switching members. Since the high pressure switch 320 is of the normally open type, its non-actuation interrupts the electrical circuit of which it is a part. Accordingly, no electric power is transmitted to the electric motor 308 in the motorized gear drive 302 so that the shield assembly 16 and the fin assembly 18 remain in a fixed relation. Should the wind speed increase, the rotation rate of the rotor assembly 14 will increase resulting, via the connection of the rotation rate control system 48 through the speed increaser 50 to the rotor assembly 14, in an increase in the pumping rate of the pump 310. As previously described, the increased pumping rate of the pump 310 results in an increased fluid flow in the hydraulic circuit of the rotation rate control system 48 and, accordingly, an increase in the pressure in the pressure tank 316. Should the rotation rate of the rotor assembly 14 rise above the upper limit of its preselected range, corresponding to the pressure required to actuate the high pressure switch 320, the high pressure switch 320 will close to transmit an electrical signal to the electric motor 308 to adjust the position of the shield 26, as previously described, decreasing the exposure of the blades 22 of the rotor assembly 14 to the wind, thereby returning the rotation rate of the rotor assembly 14 to the control range. Similarly, should the rotation rate of the rotor assembly 14 decrease below the lower extreme of its preselected range, the pumping rate of the pump 310 will decrease to such a value that the fluid pressure in the pressure tank 316 will decrease to a value below the actuation pressure of the low pressure switch 322. At this point, the low pressure switch 322 will no longer be actuated and, since the low pressure switch 322 is of the normally closed type, the switching members of the low pressure switch 322 will make electrical contact to transmit an electrical signal to the electric motor 308 in the gear drive 302, thereby actuating, as previously described, the gear drive 302 to move the shield 26 in such a manner to increase the exposure of the blades 22 of the rotor assembly 14 to the wind. Thus, should the rotation rate of the rotor assembly 14 increase to the maximum value of its preselected range, the shield 26 will be repositioned to decrease the exposure of the rotor assembly 14 to the wind, thereby decreasing the rotation rate of the rotor 14 and, should the rotation rate of the rotor assembly 14 decrease to the minimum value of its preselected range, the shield 26 will be repositioned to increase the exposure of the blades 22 to the wind, thereby increasing the rotation rate of the rotor assembly 14.

Returning once again to the blade snaps 204, a discussion will now be given to more clearly explain the manner of attaching canvas panels to the rotor assembly 14 to form sails 188 and to the shield assembly 16 to form the shield 26 and the roof 278.

A portion of a representative silicone treated canvas panel, such as the panels used to form the sails 188 and the shield 26, is shown in FIGS. 6 and 7 and denoted by the numeral 330 therein. A cord 332 is sewn into the edge of the panel 330 in order to provide a positive grip on the panel 330 by the blade snaps 204. The blade snaps 204 include a panel member 334 which, in turn, comprises a first panel section 336 and a second panel section 338. In the assembled configuration of the panel member 334, shown in FIG. 8, the first and the second panel section 336 and 338 cooperate to enclose a portion of the cord 332 and the panel 330, thereby securing the panel member 334 to the panel 330. For this purpose, the panel sections 336 and 338 are constructed in the form of generally rectangular plates, 340 and 342, respectively, with a U-shaped channel 344 formed adjacent the outer edge 346 of the first panel section 336. The first and second panel sections 336, 338 are secured to each other on opposing sides of the panel 330, in an assembled mode of the panel member 334, with the panel 330 sandwiched between the plates 340, 342 and with the cord 332 and portions of the panel 330 enclosed within the channel 344. The plates 340, 342 are provided with apertures 348 through which suitable fasteners 350, such as rivets or the like, may be inserted to secure the first panel section 336 to the second panel section 338, thereby assembling the panel sections 336, 338 into the panel member 334 with portions of the panel 330 and the cord 332 enclosed therein.

The blade snap 204 also comprises a snap member 360 which cooperates with the second panel section 334 to secure the blade snap 204 to a steel interconnecting cable, generally denoted 362 in FIGS. 7 and 8, which may be any of the sail or shield support cables 184, 198, 200, 202, 258, 260, 262 or a shield arm positioning cable 256. For this purpose, the second panel section 338 is provided with a tab 364 which extends from the outer edge 366 of the plate 342, the tab 364 being bent along an arcuate curve away from the first panel section 336 to engage and partially enclose the cable 362. The snap member 360 comprises a generally rectangular plate 268 having an arcuately curved leg 370 extending perpendicularly therefrom along the outer edge 372 of the plate 368. When the snap member 204 is assembled, by securing the snap member 360 to the second panel section 338 in a manner to be described below, the tab 364 and the leg 370 cooperate to form a tubular structure 374 having a cable retaining bore 375 which engages the cable to attach the blade snap 204 thereto.

In order to secure the snap member 360 to the second panel section 338, a stud 376 is secured to the snap member 360 and extends away from the plate 368 in a direction opposed to the direction in which the leg 370 extends from the plate 368. The length of the stud 376 is approximately equal to the thickness 378 of the second panel section plate 342 and a button 380 is secured to the extensive end of the stud 376. The second panel section plate 342 is provided with a key hole 382 having a large end 384 sufficient in size to accept the button 380 and a small end 386 sufficient in size to accept the stud 376 but insufficient in size to accept the button 380. The blade snap 204 is assembled around the cable 362 by placing the cable 362 within the arcuate curve of the tab 364, inserting the button through the large end 384 of the key hole 382, thereby enclosing the cable 362 within the tubular structure 374 formed by the tab 364 and the leg 370, and then sliding the snap member 360 along the cable 362 to move the stud 376 into the small end 386 of the key hole 382. In this assembled mode of the blade snap 204, the button 380 engages the second panel section plate 342 to secure the snap member 360 to the second panel section 338. To prevent non-deliberate disassembly, the snap member 360 is further provided with dimple 388 extending from the plate 368 in the same direction as does the stud 376. In the assembled blade snap 204, the dimple 388 extends into the large end 384 of the key hole 382 to prevent relative motion between the snap member 360 and the second panel section 338. In order to provide clearance between the button 380 and the first panel section 336, an elongated slot 390 is formed in the first panel section plate 340 as shown in FIGS. 7 and 8.

OPERATION OF THE PREFERRED EMBODIMENT

In order to provide a more detailed understanding of the operation of the wind driven power plant 10, it is perhaps well to consider the various steps the wind driven power plant 10 would undergo should a lull in the wind occur, followed by a freshening thereof in a new direction. The assumption will be made that the wind is initially of such a force that the rotor assembly 14 is rotating at a rate within its preselected control range with the shield 26 positioned to partially mask blades 22 extending in the direction 32.

As the lull commences, the effect of the wind on the rotor assembly 14 decreases resulting in a decrease in the rotation rate thereof. This decrease in the rotation rate of the rotor assembly 14 will be transmitted via the power transmission belt 210 and the speed increaser 50 to the rotation rate control system 48. As a result, the pumping rate of the pump 310 in the hydraulic circuit of the rotation rate control system 48 will decrease resulting, in turn, in a decrease in the fluid pressure in the pressure tank 316. Accordingly, the low pressure switch 322 will be actuated to transmit an electrical signal to the electrical motor 308 in the gear drive 302. The gear drive 302 will drive the cog 304 to move the shield assembly 16 about the axis 20 in a counterclockwise direction as seen from above the wind driven power plant 10. The repositioning of the shield assembly 16 will increase the exposure of blades 22 extending in the direction 32 to the wind to compensate for the reduced speed of the wind, thereby returning the rotation rate of the rotor assembly 14 to a value within the control range. As the lull continues to develop, the rotation rate control system 48 will continue to send signals to the gear drive 302 so that the exposure of the blades 22 extending in the direction 32 will be continually increased as the speed of the wind decreases. Eventually, the shield 26 will be moved to a position in which the exposure of blades 22 in the direction 32 is a maximum. At this point, a limiting switch on the gear track 284 will be engaged by the fin assembly 18 to discontinue further adjustment of the shield assembly 16. Accordingly, a further decrease in the wind speed results in a corresponding decrease in the rotation rate of the rotor assembly 14. Should the wind die down completely, the rotation rate of the rotor assembly 14 will cease and the generation of electric power will be discontinued.

When the wind freshens, the initial reaction of the wind driven power plant 10 will be to align itself in accordance with the new wind direction 28. The force of the wind on one side of the fin 296 will rotate the fin assembly 18 and, through the connecting assembly 34, the shield assembly 16 so that the fin 296 lays in the new direction 28 and blades 22 extending in the new direction 32 corresponding to the new direction 28 will be maximally exposed to the effect of the wind. Accordingly, the rotor assembly 14 will begin to rotate.

As the wind speed increases, the rotation rate of the rotor assembly 14 will reach the preselected control range. Should the freshening of the wind cease at this point, the shield 26 will remain in the position corresponding to maximum exposure of the blades 22 and the rotor assembly 14 will steadily rotate within its control range to drive the generator 24 which will again be generating electrical power. Assuming, however, that the wind speed continues to increase, the rotation rate of the rotor assembly 14 will continue to increase until it reaches the upper extreme of the control range. At this point, the rotation rate control system 48 will be pumping hydraulic fluid at a rate sufficient to establish a fluid pressure in the pressure tank 316 to close the high pressure switch 320. The closing of the high pressure switch 320 transmits an electrical signal to the gear drive 302 causing the gear drive 302 to turn the cog 304 in a direction which will rotate the shield assembly 16 in a clockwise direction, as seen from above the wind driven power plant 10. As a result, the exposure to the wind of blades 22 extending in the direction 32 will be decreased to compensate for the increased wind speed so that the rotation rate of the rotor assembly 14 remains within the control range.

Once clockwise rotation of the shield 26 has occurred, the wind driven power plant 10 will be under the control of the rotation rate control system 48. Increases in wind speed will be compensated by the rotation of the shield 26 to decrease exposure of the blades 22 extending in the direction 32 to the wind; decreases in wind speed will be compensated by increased exposure. Once this steady state has been attained, the rotation rate of the rotor assembly 14 will remain substantially constant within the control range, driving the generator 24 via the speed increaser 50 to generate a continuous output of electric power.

DESCRIPTION OF THE EMBODIMENT OF FIGS. 9 AND 10

Figure 9:
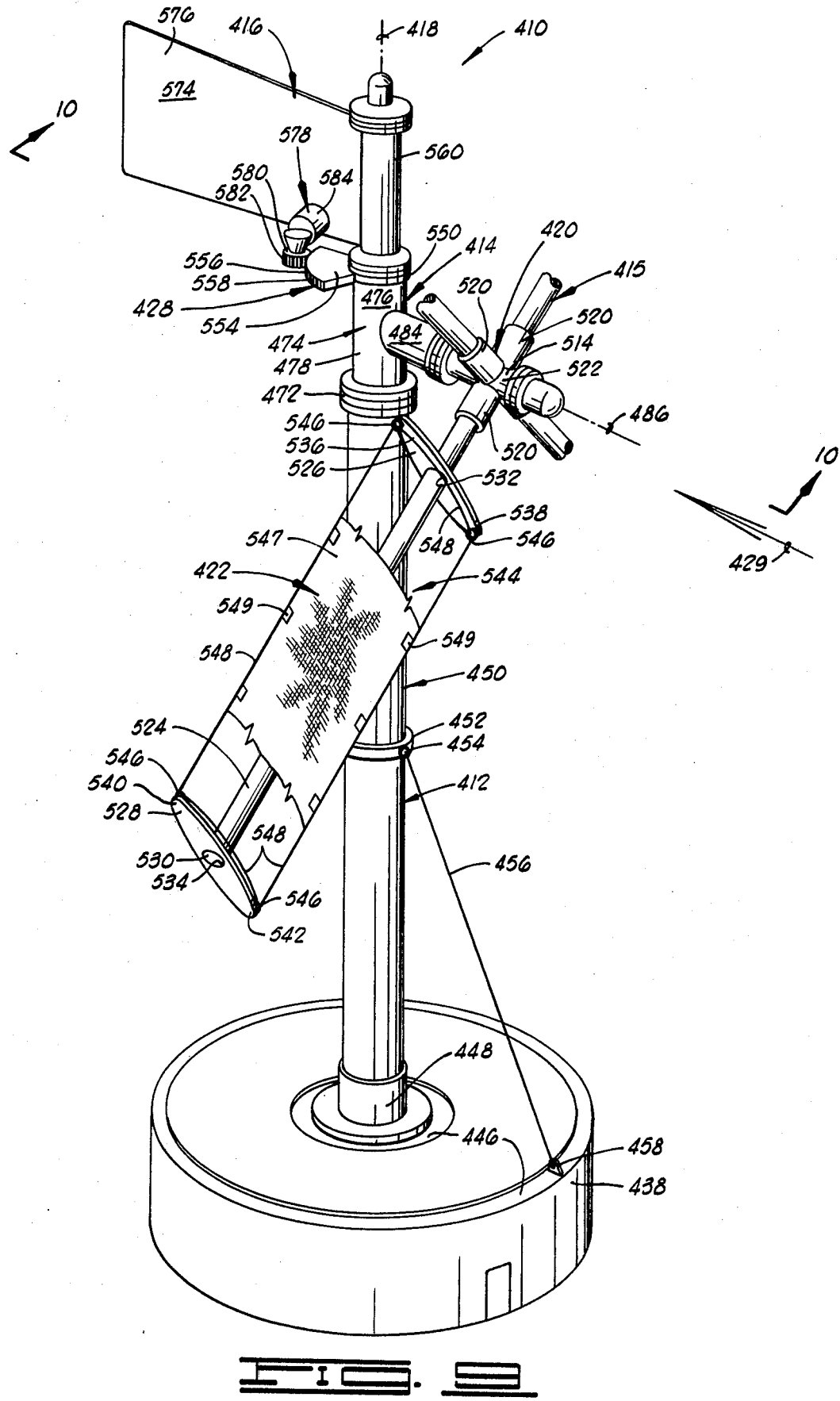
FIG. 9 is a semi-detailed view of a second embodiment of the power plant constructed in accordance with the present invention.
Figure 10:
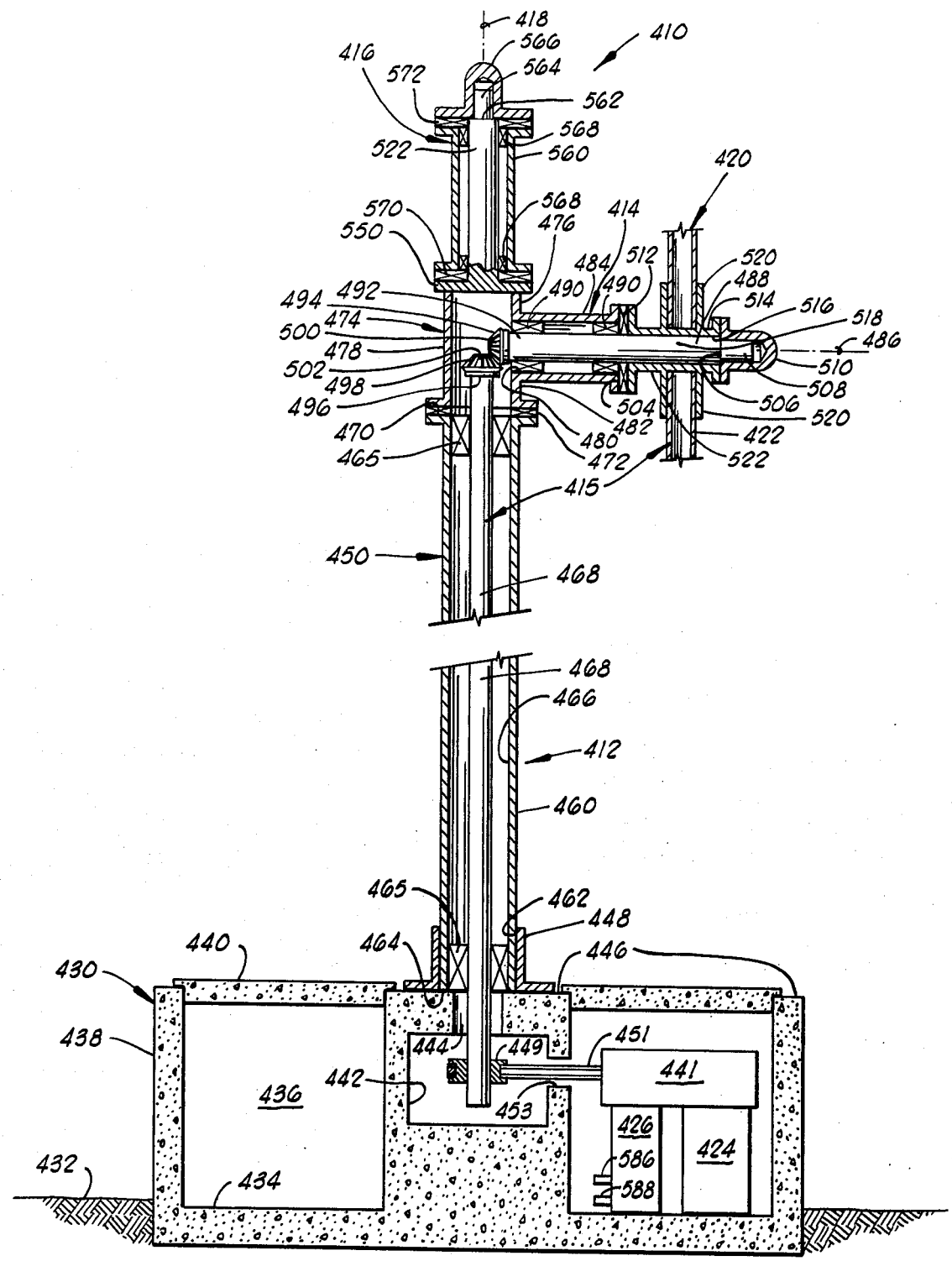
FIG. 10 is a sectional view of the support assembly taken substantially along the line 10—10 of FIG. 9 and including portions of the propeller and the fin assemblies to illustrate the mounting thereof and to illustrate the power transmission train.

A second embodiment of the present invention, shown in FIGS. 9 and 10, is a wind driven power plant that is generally designated by the numeral 410 and that is provided with an alternate means for collecting the energy of the wind. Parts of this embodiment are not shown in these figures for the same reason that parts of the first embodiment were omitted; that is, in order to more clearly point out the assembly of the power plant 410.

The second embodiment of the power plant 410 generally includes a support assembly 412, a propeller assembly 414, and a fin assembly 416. The power plant 410 is constructed about an axis 418, which extends along a generally vertical direction, and the propeller assembly 414 and fin assembly 416 are supported via the support assembly 412 in such a manner that they are rotatable about the axis 418.

As was the case with the power plant 10, an overview of the power plant 410 will perhaps be helpful to an understanding of the present embodiment. In general, the propeller assembly 414 includes a blade assembly 420, comprising a plurality of blades 422 (only one such blade has been shown in FIG. 9 in order to simplify the details of the drawing), arranged generally on a plane which is substantially parallel to the axis 418. Although a total of four blades 422 are provided for in the power plant 410, it will be understood that the power plant 410 could be provided with a greater or lesser number of blades 422 without departing from the concept of the present invention.

Each blade 422 is canted with respect to the general planar disposition of the blade assembly 420 so that wind striking the blade assembly 420 will impart thereto a rotational motion. The rotation of the blade assembly 420 is transmitted to an electric generator 424, shown in FIG. 10, for the production of electric power by a drive shaft 468, also referred to herein as a power take off member, and also shown in FIG. 10.

The drive shaft 468 and the propeller assembly 414 form the wind energy collection assembly 415 for the power plant 410 and, as was the case with the power plant 10, the wind interception area of the wind energy collection assembly 415 is varied to control the rate at which the generator 424 is driven. For this purpose, the propeller assembly 414 is angularly positionable on the support assembly 412 so that the blade assembly 420 can be caused to present a variable cross section to the wind by facing the blade assembly 420 in a direction at an angle to the direction of the wind. By increasing and decreasing the wind interception area in this manner, decreases and increases, respectively, in the force of the wind can be counteracted to maintain the rotation rate of the generator at a substantially constant value.

The positioning of the propeller assembly 414 with respect to the wind is effectuated by the fin assembly 416. The fin assembly 416 provides an anchor, aligned substantially along the direction of the wind, with reference to which the propeller assembly 414 is angularly positioned. For this purpose, a connecting assembly 428 is provided to connect the fin assembly 416 to the propeller assembly 414 in a manner that allows the blade assembly 420 to be crabbed away from a facing relation with the wind. Since the effect of the wind on the blade assembly 420 depends on the wind interception area the blade assembly 420 presents to the wind, the crabbing thereof provides a means of controlling the rotation rate of the blade assembly 420 and the generator 424.

The support assembly 412, to which attention is now directed, is shown in partial cross-sectional view in FIG. 10. Portions of the propeller assembly 414 and the fin assembly 416 have been included in FIG. 10 to illustrate the assembly of the power plant 410.

The support assembly 412 generally includes a support base 430 formed on and partially below the earth's surface 432. A portion of the support base 430 is disposed substantially parallel to the earth's surface 432 to form a floor 434 for a control room 436. A wall 438 for the control room 436 is formed by vertically extending portions of the support base 430 and the control room 436 is provided with a slab roof 440. Contained within the control room 436 is the generator 424, the rotation rate control assembly 426, and a speed increaser 441. The assemblies 424, 426 and 441 are generally constructed identically to the analogous assemblies of the power plant previously described.

A cylindrically shaped cavity 442 is formed within a portion of the support base 430 generally concentrically with the axis 418, and an opening 444, concentric with the axis 418, provides communication between the cavity 442 and the upper surface 446 of the support base 430. A tubular connector 448 is secured via bolting means or the like to the upper surface 446 of the support base 430, concentric with the axis 418, to provide a means of mounting portions of the power plant 410, external to the support base 430, upon the upper surface 446 thereof.

The support assembly 412 further comprises a drive shaft assembly 450 which is secured to the upper surface 446 of the support base 430 via the tubular connector 448. As shown in FIG. 9, the drive shaft assembly 450 extends away from the support base 430, generally along the axis 418, and has, near its midpoint, a collar 452 which forms a portion of a guying system that maintains the drive shaft assembly 450 in a generally vertical disposition along the axis 418. The collar 452 is provided with a plurality of connecting loops 454, (one such loop is shown in FIG. 9) and guying cables 456 are attached to and extend from the connecting loops 454, the guying cables 456 terminating at a plurality of anchors 458 (one such anchor is shown in FIG. 9), to which the cables 456 are attached, mounted upon and partially imbedded in the upper surface 446 of the support base 430 adjacent the wall 438. The tension in the guying cables 456 may be adjusted by turnbuckles (not shown) interposed therein.

Returning now to FIG. 10, the drive shaft assembly 450 includes a central support shaft 460, a portion of which contactingly engages and is disposed within the bore 462 of the tubular connector 448. The lower end 464 of the central support shaft 460 contactingly engages and is supported by the upper surface 446 of the support base 430. Additional support for the drive shaft assembly 450 may be provided by welding the central support shaft 460 to the tubular connector 448.

The central support shaft 460 has a longitudinal bore 466 and bearings 465, mounted within the bore 466, rotatably support and align the drive shaft 468 about the axis 418. As will be discussed more fully below, the drive shaft 468 transmits the rotation of the blade assembly 420 to components of the power plant 410 located within the control room 436.

The propeller assembly 414 is rotatably mounted upon the upper end 470 of the central support shaft 460. A bearing assembly, indicated schematically as a simple bearing 472 in FIG. 10, is provided to secure the propeller assembly atop the central support shaft 460 in such a manner that the propeller assembly may rotate about the axis 418. Bearing assemblies having this capability are well known in the art and further description is not necessary for the present disclosure. The propeller assembly 414, which includes the blade assembly 420, is provided with an angle gear box 474 to transform the wind driven rotation of the blade assembly 420 in a substantially vertical plane into a rotation of the drive shaft 468 about the axis 418 so that the rotational energy developed in the blade assembly 420 may be delivered to the generator 424.

In general, the angle gear box 474 includes a gear box housing 476 having two tubular members disposed at right angles to each other. A first tubular member 478 is rotatably secured to the drive shaft assembly 450, via the bearing assembly 472, so that the first tubular member 478 is disposed generally concentrically about the axis 418 and is free to rotate thereabout. An aperture 480 is formed in the cylindrical wall 482 of the first tubular member 478 and a second tubular member 484 is secured to the first tubular member 478, about the aperture 480, in such a manner that the interior of the tubular member 484 is in communication with the interior of the first tubular member 478 and the second tubular member 484 extends transversely from the first tubular member 478. Since the first tubular member 478 is concentric with the axis 418, the second tubular member 484 has an axis 486 which is transverse to the axis 418; the axis 486 thus being disposed in a generally horizontal plane. The axis 486 may be disposed in any geographical direction by rotating the first tubular member 478 about the axis 418 so that, as will be discussed more fully below, the axis 486 may be directed at any selected angle with respect to the direction of the wind.

A propeller shaft 488 is mounted partially within the second tubular member 484 via bearings 490 which rotatably secure the propeller shaft 488 in partial disposition within the second tubular member 484 and maintain the propeller shaft 488 in concentric alignment about the axis 486. Bearings having these capabilities are well-known in the art and further description is not necessary for the disclosure.

The propeller shaft 488 extends, at its inner end 492, into the first tubular member 478 and the inner end 492 of the propeller shaft 488 is provided with a bevel gear 494. The upper end 496 of the drive shaft 468 similarly extends into the first tubular member 478 and is similarly provided with a bevel gear 498. The teeth 500, 502 of the bevel gears 494, 498 mesh so that a rotation of the propeller shaft 488 will cause a corresponding rotation of the drive shaft 468.

The propeller shaft 488 extends outwardly from the axis 418 beyond the outer end 504 of the second tubular member 484 and the blade assembly 420 is mounted on the propeller shaft 488 adjacent to the outer end 506 thereof. In order to secure the blade assembly 420 on the propeller shaft 488, the propeller shaft 488 has a threaded projection 508 at its outer end 506, and a threaded cap 510 is screwed onto the projection 508 to clamp portions of the blade assembly 420 between the cap 510 and the outer end 504 of the second tubular member 484. A bearing 512 is interposed between the blade assembly 420 and the second tubular member 484 to reduce frictional drag therebetween.

The blade assembly 420 includes a tubular hub 514 and the blades 422 are attached to the hub 514 and extend radially therefrom. The bore 516 of the hub 514 is sized to engage the peripheral surface 518 of the propeller shaft 488 so that the hub may be slipped on the propeller shaft 488. The bore 516 of the hub 514 and the peripheral surface 518 of the propeller shaft 488 are provided with grooves (not shown) which accept a key (not shown) to fix the angular relationship of the hub 514 and the propeller shaft 488. Thus, the blade assembly is mounted on the power plant 410, concentric with the axis 486, by slipping the hub 514 over the propeller shaft 488, aligning the grooves (not shown) in the hub 514 and propeller shaft 488, inserting the key (not shown) in the grooves (not shown), and screwing the cap 510 onto the projection 508 thereby clamping the hub 514 between the cap 510 and the second tubular member 484.

A plurality of tubular connectors 520, extending radially from the outer peripheral surface 522 of the hub 514, are formed integrally with the hub 514 to provide a means of attaching the blades 422 to the hub 514. Although four such connectors 520, providing attachment means for four blades 422, are illustrated in FIG. 9, it will be clear to one skilled in the art that a greater or lesser number of connectors 520 and blades 422 could be used without departing from the concept of the present invention.

The blades 422 are identical in construction so that it is not necessary to describe each of the blades 422 in order to provide an understanding of their construction. Thus, in order to simplify the drawings, only one blade 422 has been illustrated in FIG. 9. Illustrated portions of the other blades have been numbered identically with corresponding portions of the blade 422 which has been illustrated. The blade 422 is provided with a sail 547. The sail 547 is shown in cut away in order to illustrate other portions of the blade 422.

Referring now to FIG. 9, each blade 422 comprises a tubular boom 524 which slips into a connector 520 on the hub 514 so that booms 524 extend radially from the axis 486 and are disposed substantially in a plane perpendicular to the axis 486 and parallel to the axis 418. The booms 524 are secured to the connectors 520 by, for example, welding.

Each boom 524 is provided with a spacer 526 disposed transversely to the boom 524 and located a distance from the hub 514. The spacers 522 are secured to the booms 524, by welding for example, in such a manner that they are canted with respect to the generally planar disposition of the totality of booms 514; that is, with respect to the general planar disposition of the blade assembly 420. A blade end 528 is secured, by welding for example, to the distal end 530 of each boom 524; the blade end 528 being canted with respect to the blade assembly 420 so that the blade end 528 is parallel to the spacer 526 and spaced a distance therefrom. The blade end 528 and spacer 526 have identical construction, the blade end 528 and spacer 526 being generally elongated elliptical plates having central apertures 532, 534 which engage the boom 524 in such a manner that the spacer 526 and blade end 528 extend transversely to the boom 524 and are disposed symmetrically thereabout.

The spacer 526 has a first end 536 and a second end 538, the ends 536 and 538 being disposed on opposite sides of the boom 524, and the blade end 528 has corresponding first and second ends 540 and 542, similarly disposed about the boom 524. The first end 540 of the blade end 528 is aligned with the first end 536 of the spacer 526 and the second end 542 of the blade end 528 is aligned with the second end 538 of the spacer 526 so that the ends 536, 538, 540, and 542 of the spacer 526 and the blade end 528 are disposed at the corners of a rectangle 544 as shown in FIG. 9. Loop connectors 546 are attached to the ends 536, 538, 540, and 542 and sail support cables 548 are attached to and extend between pairs of loop connectors 546 to form the sides of the rectangle 544. A sail 547, preferably a panel of silicone treated canvas sized to fit within the rectangle 544, is attached to the sail support cables 548 via blade snap assemblies 549, identical in construction to the blade snaps 402 used in the first embodiment of the present invention, to complete the blade 422.

As illustrated in FIG. 10, rotational energy imparted to the blade assembly 420 by the wind is transmitted to the support base 430 via the propeller shaft 488 and the drive shaft 468. The drive shaft 468 extends through the opening 444 in the support base 430 and into the cavity 442 formed therein. A sheave 449 is affixed to the portion of the drive shaft 468 located within the cavity 442 and is disposed concentrically with the axis 418. A power transmission means 451 which, in this embodiment, is a belt, contacts and is driven by the sheave 449 to transmit power from the drive shaft 468 to the speed increaser 441. An opening 453 in support base 430 serves as a passage between the cavity 442 and the control room 436. Although a transmission belt 451 is depicted in FIG. 10, it will be recognized that other transmission systems can be utilized without departing from the concept of the present invention.

To provide for the support of the fin assembly 416, the propeller assembly 414 includes a cover plate 550 boltingly or otherwise secured in a capping relation to the first tubular member 478 of the angle gear box 474, the cover plate 550 having an integrally formed fin support shaft 552 extending therefrom generally along the axis 418 of the power plant 410.

The fin assembly 416 comprises a fin sleeve 560 that is rotatably mounted on the fin support shaft 552 immediately above the angle gear box 474, as is best viewed in FIG. 10. In order to secure the fin sleeve 560 to the fin support shaft 552, the fin support shaft 552 is provided at its upper end 562 with a threaded projection 564 and a cap 566 may be secured on the projection 564 to form an obstruction which prevents longitudinal displacement of the fin sleeve 560 along the fin support shaft 552. Suitable bearings 568 are mounted in supporting engagement between the fin sleeve 560 and the fin support shaft 552 to facilitate free rotational movement of the fin assembly 416. Bearings 570 are interposed between the fin sleeve 560 and the cover plate 550 and bearings 572 are interposed between the fin sleeve 560 and the cap 566 to support and position the fin assembly 416 on the fin support shaft 552 while permitting free rotation of the fin assembly 416 relative to the propeller assembly 414.

Referring now to FIG. 9, shown therein is a gear track flange 554 attached to the cover plate 550 and disposed concentrically about the axis 418 of the power plant 410. The gear track flange 554 is part of the adjustable connecting assembly 428 and has a gear track 556 with a plurality of gear teeth 558 formed along the periphery of the gear track flange 554 to provide a means of establishing and selectively varying the connection between the propeller assembly 414 and the fin assembly 416 in a manner and for a purpose that will be made clear below.

The fin assembly 416 comprises a fin 574 which is constructed in a manner similar to the construction of the fin 298 of the power plant 10; that is, the fin 574 includes a truss structure (not illustrated) covered by a skin 576, made of sheet metal or the like, attached to the truss structure (not shown) by any suitable means such as, for example, rivets.

The fin assembly 416 further comprises a motorized gear drive 578, of conventional design, which rotatably supports a cog 580 having gear teeth 582. The gear drive 578 is supported by the fin 574 and is spatially positioned so that the cog 580 engages the gear track 556 of the propeller assembly 414; that is, the gear teeth 582 mesh with the gear teeth 558 of the gear track 556.

The motorized gear drive 578 and the cog 580 form a driving portion of the adjustable connecting assembly 428 and the gear track 558 forms a driven portion thereof. The gear drive 578 has a reversible electric motor 584 that selectively drives the cog 580 in a rotational direction so as to move the cog 580 along the gear track 556 to adjust the position of the fin 574 relative to the gear track flange 554 of the propeller assembly 414. The electrical wires and power supply connected to the electrical motor 584 are not shown as these are conventional, and the control means for selectively rotating the cog 580 will be discussed below. Also, limit switches (not shown) are mounted on the gear track 556 to interrupt the supply of electric power to the gear drive 578 when the cog 580 reaches either extreme position of a preselected range of travel on the gear track 556.

It will be clear that the fin 574 will align itself along the direction 429 of the wind, and that the orientation of the propeller assembly 414 relative to the wind is determined by the configuration of the connecting assembly 428; that is, by the location of the cog 580 on the gear track 556. Thus, the direction of the axis 486 of the propeller shaft 488 may be disposed at a greater or lesser angle to the direction 429 of the wind by actuating the motorized gear drive 578 to move the cog 580 along the gear track flange 554.

The above mentioned limit switches (not shown) that are disposed on the gear track flange 554 fix the extreme angles between the axis 486 and the direction 429 in the same manner that limit switches were used to fix the extreme dispositions of the shield 26 with respect to the direction 28 of the wind in the power plant 10. In particular, one limit switch is positioned such that, in one extreme disposition of the propeller assembly 414, the blade assembly 420 faces directly into the wind resulting in maximum coupling of the blade assembly 420 to the wind. A second limiting switch fixes a second extreme disposition of the propeller assembly 414 such that the plane of the blade assembly 420 is disposed perpendicularly to the wind direction 429 resulting in minimum coupling of the blade assembly 420 to the wind.

The gear drive 578 can be actuated to turn the cog 580 in a clockwise direction as viewed from above the power plant 410, or in a counterclockwise direction, with the result in either case that the cog 580 will move along the gear track 556 to adjust the relative orientation of the fin assembly 416 and the propeller assembly 414. The direction in which the fin assembly 416 will extend from the fin support shaft 552 is determined by the direction of the wind and, consequently, any change in the relative orientation of the propeller assembly 414 to the fin assembly 416 is accomplished by rotation of the propeller assembly 414 such that the blade assembly 420 is turned toward or away from a facing relation with the direction 429 of the wind. In particular, when the gear drive 578 is actuated to turn the cog 580 in a clockwise direction, the blade assemblage 420 is turned toward a facing relation with the wind to increase the coupling of the blade assemblage 420 to the wind resulting in an increase in the rotation rate of the blade assemblage 420. Conversely, when the gear drive 578 is actuated to turn the cog 580 in a counterclockwise direction, the propeller assemblage 420 is turned farther away from a facing relation with the wind to decrease the coupling of the blade assemblage 420 to the wind resulting in a decrease in the rotation rate of the blade assemblage 420.

The gear drive 578 is actuated to turn the cog 580 in either direction by the rotation rate control system 426 shown as a block in FIG. 10. The rotation rate control system 426 is identical to the rotation rate control system 24 used in conjunction with the first embodiment of the present invention so that further description of the rotation rate control system 426 is unnecessary for the present disclosure. It will suffice to note that the rotation rate control system 426 incorporates a high pressure switch 586 and a low pressure switch 588 which provide the same control functions as the corresponding high and low pressure switches, 320 and 322, respectively, found in the rotation rate control system 48 of the first embodiment. Thus, the high pressure switch 586, when closed, provides an electrical connection between an electrical power source (not shown) and the gear drive 578, via conventional slip rings (not shown) on the drive shaft assembly 450 and an electrical conduit (not shown). The reversible electric motor 584, when actuated via the high pressure switch 586, is supplied with power to cause the gear drive 578 to turn the cog 580 in a direction to move the gear track 556 in the clockwise direction, as viewed from above the power plant 410. This increases the misalignment of the blade assembly 420 to the wind and decreases the rotation rate thereof.

Similarly, the rotation rate control system 426 incorporates a low pressure switch 588 which, via slip rings (not shown) and electrical conduits (not shown), provides an electrical connection to the gear drive 578 to drive the cog 580 in a direction to move the gear track 556 in a counterclockwise direction. Thus, the cog 580, coacting with the gear track 556, turns the blade assembly 420 more nearly into a facing relation with respect to the wind to increase the coupling of the blade assembly 420 to the wind, thereby increasing the rotation rate thereof.

OPERATION OF THE EMBODIMENT IN FIGS. 9 AND 10

A better understanding of the operation of the second embodiment may be gained from considering the steps the power plant 410 would undergo should a lull in the wind, followed by a freshening thereof in a new direction, occur. It is assumed that the wind is initially of such a force that the blade assembly 420 is rotating within a preselected control range established by the adjustment of the rotation rate control assembly 426 and that the blade assembly 420 is in a partial facing relation with the wind; that is, the axis 486 of the propeller shaft 488 is disposed at an angle to the direction 429 of the wind.

As the lull commences, the effect of the wind on the blade assembly 420 decreases resulting in a decrease in the rotation rate thereof. The decrease in the rotation rate will be sensed by the rotation rate control system 426 which, in turn, will respond by closing the low pressure switch 588. An electrical signal will thereby be transmitted to the motorized gear drive 578 to turn the cog 580 in such a direction to rotate the propeller assembly 418 such that the blade assembly 420 more nearly faces the wind. In this manner, the coupling of the blade assembly 420 to the wind is increased to counteract the decrease in wind force, resulting in a return of the rotation rate of the blade assemblage 420 to the preselected control range. As the lull deepens, the blade assembly 420 is continually adjusted toward a direct facing relation with the wind to maintain the rotation rate thereof at the lower limit of the control range. Eventually, the blade assembly 420 will be faced directly into the wind; that is, one extreme disposition of the blade assembly 420 will be reached so that one of the limit switches (not shown) on the gear track flange 554 will interrupt the circuit containing the low pressure switch 588, thereby preventing further changes in the direction of the blade assembly 420 as the wind continues to die.

It is noted, that the circuit containing the high pressure switch 586 is, at this point, interrupted only by the non-actuation of the high pressure switch 486 so that, should the wind freshen at this point, the high pressure switch 486 could actuate the motorized gear drive 578 to turn the blade assembly 420 away from a facing relation with the wind. However, assume that the wind continues to die. Eventually, the effect of the wind on the blade assembly 420 becomes negligible and the blade assembly 420 will, of course, cease to rotate.

When the wind freshens, the initial response of the power plant 410 will be to face the blade assembly 420 into whatever direction the wind is coming from. In particular, if the direction 429 of the wind has changed, the wind will strike one side of the fin 574 and exert a torque thereon to rotate the fin 574 about the fin support shaft 552 until the fin 574 is aligned with the wind. Since the blade assembly 420 was caused to be aligned in a facing relation to the wind by adjustment of connecting assembly 428 as the lull commenced and deepened, the connecting assembly 428, which will not yet have been readjusted since the wind died completely, will again cause the blade assembly 420 to face the wind when the fin 574 aligns itself with the wind.

With the blade assembly 420 in this relation to the wind, the effect of the wind on the blade assembly 420 will cause the blade assembly 420 and propeller shaft 488 to rotate about the axis 486. This rotation will be transmitted to the generator 424 via the drive shaft 468 and transmission belt 451 so that generation of electric power is resumed.

As the wind continues to freshen, the rotation rate of the blade assembly 420 continues to increase until the preselected upper limit of the rotation rate control range is reached. At this point, the rotation rate control assembly 426 actuates the high pressure switch 586 to transmit an electrical signal to the motorized gear drive 578, whereupon the gear drive 578 rotates the gear track flange 554, via the cog 580, in a direction to turn the propeller assembly 414 in a clockwise direction as seen from above the power plant 410. As a result, the blade assembly 420 will be turned away from a direct facing relation with the wind by whatever angle is necessary to maintain the rotation rate of the blade assembly 420 at the upper limit of the preselected control range.

Once the blade assembly 420 has been turned from the direct facing relation with the wind, the rotation rate of the blade assembly 420 is under the control of the rotation rate control assembly 426. The initial angular displacement of the propeller assembly 414 will open the limit switch which prevents the blade assembly 420 from overshooting the direct facing relation with the wind when its rotation rate decreases so that subsequent adjustment of the connecting assembly 428 is made only by the closing of either the high pressure switch 486 or the low pressure switch 488. Accordingly, the blade assembly 420 will thereafter continue to rotate at a substantially constant rate to generate electrical power having the appropriate frequency and amplitude characteristics while the rotation rate control assembly 426, sensing variations in the rotation rate arising from variations in wind speed, transmits electrical control signals to the connecting assembly 428 to adjust the orientation of the blade assembly 420 with respect to the wind, thereby maintaining the rotation rate of the blade assembly 420 within the preselected, narrow control range.

It is evident that the presently described invention provides a wind driven power plant capable of contributing to the generating capacity of a power distribution grid. Also, it is evident that the other objects, advantages and features described hereinabove are fully met by the described invention. It will be recognized that changes may be made in the construction and the arrangement of the parts or elements of the embodiments disclosed herein without departing from the spirit and the scope of the invention as defined in the following claims.

What is claimed is:

1. A wind driven power plant comprising:
   a support assembly having a central support shaft;
   wind energy collection means supported by the support assembly for presenting a controllably variable wind interception area to the wind, the wind energy collection means characterized as comprising a rotatable power take off member;
   rotation rate control means, connected to the power take off member, for generating a positioning signal in response to a variation in the rotation rate of the power take off member, the rotation rate control means comprising:
      a hydraulic circuit comprising:
         a hydraulic fluid reservoir;
         a pressure tank;
         pump means, connected to the power take off member and driven thereby, for transferring hydraulic fluid from the reservoir to the pressure tank at a rate proportional to the rotation rate of the power take off member; and
         a manual set orifice, fluidically connecting the pressure tank to the reservoir to complete the hydraulic circuit, the manual set orifice providing a resistance to fluid flow to vary the pressure in the pressure tank in proportion to the rate of fluid flow in the hydraulic circuit; and
      switch means, in fluidic communication with the pressure tank, for generating an electrical signal when the fluid pressure in the pressure tank attains a preselected upper limiting value and when the fluid pressure falls to a preselected lower limiting value, the switch means comprising:
         a high pressure limit switch; and
         a low pressure limit switch;
   anchor means, angularly positionable about the axis of the central support shaft, for providing an anchor substantially fixed in relation to the direction of the wind; and
   connecting means, adjustably connecting the wind energy collection means and the anchor means, for adjusting the wind energy collection means to vary the wind interception area thereof presented to the wind in response to the positioning signal from the rotation rate control means, the connecting means having a driving portion, attached to one of the anchor means and the wind energy collection means, and a driven portion, connected to the other of the anchor means and the wind energy collection means.

2. The wind driven power plant of claim 1 wherein the wind energy collection means is characterized as comprising:
   a propeller assembly; and
   a drive shaft.

3. A wind driven power plant comprising:
   a support assembly having a central support shaft;
   wind energy collection means supported by the support assembly for presenting a controllably variable wind interception area to the wind, the wind energy collection means characterized as comprising:
      a rotor assembly having a rotatable power take off member; and
      a shield assembly having a shield portion concentric with the rotor assembly to partially mask the rotor assembly from the wind;
   rotation rate control means, connected to the power take off member, for generating a positioning signal in response to a variation in the rotation rate of the power take off member;
   anchor means, angularly positionable about the axis of the central support shaft, for providing an anchor substantially fixed in relation to the direction of the wind; and
   connecting means, adjustably connecting the wind energy collection means and the anchor means, for adjusting the wind energy collection means to vary the wind interception area thereof presented to the wind in response to the positioning signal from the rotation rate control means, the connecting means having a driving portion, attached to one of the anchor means and the wind energy collection means, and a driven portion, connected to the other of the anchor means and the wind energy collection means.

4. The wind driven power plant of claim 3 further comprising an electric generator driven by the power take off member to generate electrical energy.

5. The wind driven power plant of claim 3 wherein the driven portion of the connecting means is characterized as comprising a gear track and wherein the driving portion is characterized as comprising:
   a motorized gear drive; and
   a cog connected to the gear drive and rotatable thereby, the cog meshingly contacting the gear track.

6. A wind driven power plant comprising:
   a support assembly characterized as comprising a central support shaft;
   a rotor assembly, rotatably supported on the support assembly to rotate about the longitudinal axis of the central support shaft;
   a shield assembly, supported by and angularly positionable on the support assembly, the shield assembly having a shield portion disposed partially about the rotor assembly;
   rotation rate control means, connected to the rotor assembly, for generating a shield positioning signal in response to a variation in the rotation rate of the rotor assembly;
   anchor means, angularly positionable about the axis of the central support shaft for providing an anchor substantially fixed in relation to the direction of the wind; and connecting means, adjustably connecting the anchor means and the shield assembly, for positioning the shield portion to vary the exposure of the rotor assembly to the wind in response to the shield positioning signal, the connecting means having a driving portion, attached to one of the anchor means and the shield assembly, and a driven portion, attached to the other of the anchor means and shield assembly.

7. The wind driven power plant of claim 6 wherein the anchor means is characterized as being a fin assembly comprising:

a fin sleeve, concentric with the longitudinal axis of the central support shaft; and a fin, attached to the fin sleeve and extending radially from the longitudinal axis of the central support shaft;

wherein the driven portion of the connecting means is characterized as being a gear track attached to the shield assembly and wherein the driving portion of the connecting means is characterized as comprising:

a motorized gear drive supported by the fin; and a cog, connected to the motorized gear drive and rotatable thereby, the cog meshingly engaging the gear track.

8. The wind driven power plant of claim 6 wherein the support assembly further comprises:

a support base pivotally supporting the central support shaft;

a vertical position support bonnet comprising:

a bonnet hub attached to the central support shaft; and a plurality of bonnet arms, attached to the bonnet hub and extending radially therefrom; and a cable means, attached to the bonnet arms, for aligning the central support shaft along a substantially vertical direction.

9. The wind driven power plant of claim 8 wherein the bonnet arms are characterized as being truss structures.

10. The wind driven power plant of claim 6 wherein the rotor assembly comprises:

a central rotor structure comprising:

an upper rotor sleeve concentric with the axis of the central support shaft;

a lower rotor sleeve concentric with the axis of the central support shaft; and a central truss structure connected to the upper rotor sleeve and to the lower rotor sleeve and extending there between to maintain the rotor sleeves in a spaced apart relation;

a plurality of upper rotor arms attached to the upper rotor sleeve and extending radially therefrom;

a plurality of lower rotor arms attached to the lower rotor sleeve and extending radially therefrom; and a plurality of sails, each sail extending between an upper rotor arm and a lower rotor arm.

11. The wind driven power plant of claim 10 wherein the upper rotor arms and the lower rotor arms are characterized as being truss structures.

12. The wind driven power plant of claim 10 wherein the sails are characterized as being silicone treated canvas panels and wherein the rotor assembly further comprises:

cable means, attached to the rotor arms, for mounting the sails on the rotor assembly; and panel attachment means, attached to the sails and to the cable means for supporting the sails on the cable means.

13. The wind driven power plant of claim 12 wherein the panel attachment means is characterized as comprising a plurality of blade snaps, each blade snap comprising:

a panel member, attached to the canvas panel, the panel member having a tab portion;

a snap member, having a leg portion; and means for attaching the snap member to the panel member in an assembled mode of the blade snap, the leg portion of the snap member positioned in a predetermined spatial relationship to the tab portion of the panel member in the assembled mode of the blade snap forming therewith a tubular structure having a cable retaining bore, a portion of the cable means being fixedly maintained in the cable retaining bore of the blade snap.

14. The wind driven power plant of claim 6 wherein the shield assembly comprises:

an upper shield sleeve concentric with the longitudinal axis of the central support shaft;

a lower rotor sleeve concentric with the longitudinal axis of the central support shaft;

a plurality of shield support arms attached to the upper shield sleeve and extending radially therefrom;

a plurality of shield support arms attached to the lower shield sleeve and extending radially therefrom; and a shield, supported by the shield support arms attached to the upper shield sleeve and by the shield support arms attached to the lower shield sleeve, the shield extending partially about the rotor assembly to partially mask the rotor assembly from the wind.

15. The wind driven power plant of claim 14 wherein the shield support arms are characterized as being truss structures.

16. The wind driven power plant of claim 14 wherein the shield comprises a plurality of silicone treated canvas panels and wherein the shield assembly further comprises:

cable means, attached to the shield support arms, for mounting the shield on the shield assembly; and panel attachment means, attached to the panels and to the cable means, for supporting the panels on the cable means.

17. A wind driven power plant comprising:

a support assembly comprising:

a support base;

a central support shaft pivotally supported by the support base;

a vertical position support bonnet comprising:

a bonnet hub attached to the central support shaft;

a plurality of bonnet arms, attached to the bonnet hub and extending radially therefrom; and cable means, attached to the bonnet arms, for aligning the central support shaft along a substantially vertical direction;

a rotor assembly, rotatably supported by the support assembly to rotate about the longitudinal axis of the central support shaft, the rotor assembly comprising:

a central rotor structure concentric with the longitudinal axis of the central support shaft, the central rotor structure characterized as comprising a lower rotor sleeve;

a plurality of blades, attached to the central rotor structure and extending radially therefrom each blade comprising:
- an upper rotor arm;
- a lower rotor arm;
- a sail extending between the upper rotor arm and the lower rotor arm;
- cable means, attached to the rotor arms, for mounting the sail on the rotor arms; and
- means for attaching the sail to the cable means; and a shield assembly, rotatably supported by the support assembly and angularly positionable about the longitudinal axis of the central support shaft, the shield assembly comprising:
- an upper shield sleeve supported by the central support shaft in a concentric relation with the longitudinal axis thereof;
- a lower shield sleeve supported by the support base in a concentric relation with the longitudinal axis of the central support shaft;
- a plurality of shield support arms attached to the upper shield sleeve and extending radially therefrom;
- a plurality of shield support arms attached to the lower shield sleeve and extending radially therefrom;
- a shield, supported by the shield support arms attached to the upper shield sleeve and by the shield support arms attached to the lower shield sleeve, the shield extending partially about the rotor assembly to partially mask the rotor assembly from the wind;
- cable means, connected to the shield support arms, for mounting the shield on the shield support arms;
- means for attaching the shield to the cable means; and
- a gear track connected to the upper shield sleeve and disposed concentrically about the longitudinal axis of the central support shaft;

rotation rate control means, connected to the lower rotor sleeve, for generating a shield positioning signal in response to a variation in the rotation rate of the lower rotor sleeve the rotation rate control means comprising:
- a hydraulic circuit comprising:
  - a hydraulic fluid reservoir;
  - a pressure tank;
  - pump means, connected to the lower rotor sleeve and driven thereby, for transferring hydraulic fluid from the reservoir to the pressure tank at a rate proportional to the rotation rate of the lower rotor sleeve; and
  - a manual set orifice, fluidically connecting the pressure tank to the reservoir to complete the hydraulic circuit, the manual set orifice providing a resistance to fluid flow to vary the pressure in the pressure tank in proportion to the rate of fluid flow in the hydraulic circuit; and
- switch means in fluidic communication with the pressure tank, for generating an electrical signal when the pressure in the pressure tank attains a preselected upper limiting value and when the pressure in the pressure tank falls to a preselected lower limiting value, the switch means comprising:
  - a high pressure limit switch which closes when the pressure in the pressure tank attains the preselected upper limit; and
  - a low pressure limit switch which closes when the pressure in the pressure tank falls to the preselected lower limit;

a fin assembly, supported by the shield assembly and angularly positionable about the longitudinal axis of the central support shaft, the fin assembly comprising:
- a fin sleeve concentric with the longitudinal axis of the central support shaft;
- a fin attached to the fin sleeve and extending therefrom to form an anchor substantially fixed along the direction of the wind;
- a cog meshingly engaging the gear track on the shield assembly; and
- a motorized gear drive, supported by the fin and drivingly supporting the cog, the motorized gear drive repositioning the shield, via the cog and gear track, to increase the masking of the rotor assembly from the wind in response to a shield positioning signal transmitted by the high pressure limit switch and repositioning the shield, via the cog and gear track, to decrease the masking of the rotor assembly from the wind in response to a shield positioning signal transmitted by the low pressure limit switch; and an electric generator connected to the lower rotor sleeve for generating electric power.

18. The wind driven power plant of claim 17 wherein the upper rotor arms, the lower rotor arms, the shield support arms, and the bonnet arms are characterized as being truss structures.

19. The wind driven power plant of claim 17 wherein the sails on the blades and the shield are characterized as comprising silicone treated canvas panels and wherein the means for attaching the sails to the cable means of the blades and for attaching the shield to the cable means of the shield assembly are characterized as comprising a plurality of blade snaps, each blade snap comprising:
- a panel member, attached to the canvas panel, the panel member having a tab portion;
- a snap member, having a leg portion; and
- means for attaching the snap member to the panel member in an assembled mode of the blade snap, the leg portion of the snap member positioned in a predetermined spatial relationship to the tab portion of the panel member in the assembled mode of the blade snap forming therewith a tubular structure having a cable retaining bore, a portion of the cable means being fixedly maintained in the cable retaining bore of the blade snap.

20. A wind driven power plant comprising:
- a support assembly characterized as comprising a central support shaft supported along a substantially vertical direction;
- a propeller assembly, supported by the central support shaft and angularly positionable about the longitudinal axis of the central support shaft, the propeller assembly comprising:

a propeller shaft mounted to rotate about an axis generally transverse to the longitudinal axis of the central support shaft;

a blade assembly to rotate the propeller shaft in response to the force of the wind, the blade assembly characterized as having a generally planar configuration and comprising a plurality of blades, each blade extending radially from the axis of the propeller shaft and each blade being canted with respect to the general planar configuration of the blade assembly;

a drive shaft connected to the propeller shaft and rotated thereby;

rotation rate control means, connected to the drive shaft, for generating a propeller assembly positioning signal in response to a variation in the rotation rate of the drive shaft;

anchor means, angularly positionable about the longitudinal axis of the central support shaft, for providing an anchor substantially fixed in relation to the direction of the wind; and connecting means, adjustably connecting the anchor means and the propeller assembly, for angularly positioning the propeller assembly with respect to the anchor means in response to the propeller assembly positioning signal whereby the blade assembly is crabbed away from the direction of the wind, the connecting means having a driving portion, attached to one of the anchor means and the propeller assembly, and a driven portion, attached to the other of the anchor means and propeller assembly.

21. The wind driven power plant of claim 20 wherein the anchor means is characterized as being a fin assembly comprising:
  a fin sleeve, supported by the propeller assembly, concentric with the longitudinal axis of the central support shaft; and
  a fin attached to the fin sleeve and extending radially from the longitudinal axis of the central support shaft;
wherein the driven portion of the connecting means is characterized as being a gear track attached to the propeller assembly and wherein the driving portion of the connecting means is characterized as comprising:
  a motorized gear drive supported by the fin; and
  a cog, attached to the motorized gear drive and rotatable thereby, the cog meshingly engaging the gear track.

22. The wind driven power plant of claim 20 wherein each blade of the blade assembly comprises:
  a boom supported by and extending radially from the propeller shaft;
  a blade end, attached to the extensive end of the boom and disposed generally transversely thereto;
  a spacer, attached to the boom between the blade end and the propeller shaft, the spacer being disposed generally transversely to the boom in general alignment with the blade end; and
  a sail extending between the blade end and the spacer.

23. The wind driven power plant of claim 22 wherein the sail is characterized as comprising a silicone treated canvas panel and wherein each blade further comprises:
  cable means, connected to the blade end and to the spacer, for mounting the sail on the blade; and
  means for attaching the sail to the cable means.

24. The wind driven power plant of claim 21 wherein the rotation rate control means comprises:
  a hydraulic circuit comprising:
    a hydraulic fluid reservoir;
    a pressure tank;
    pump means, connected to the drive shaft and driven thereby, for transferring hydraulic fluid from the reservoir to the pressure tank at a rate proportional to the rotation rate of the drive shaft; and
    a manual set orifice, fluidically connecting the pressure tank to the reservoir to complete the hydraulic circuit, the manual set orifice providing a resistance to fluid flow to vary the pressure in the pressure tank in proportion to the rate of fluid flow in the hydraulic circuit; and
  switch means, in fluidic communication with the pressure tank, for generating an electrical signal when the fluid pressure in the pressure tank attains a preselected upper limiting value and when the fluid pressure falls to a preselected lower limiting value, the switch means comprising: a high pressure limit switch; and a low pressure limit switch.

25. The wind driven power plant of claim 20 further comprising an electric generator drivingly connected to the drive shaft to generate electric power.

* * * * *

UNITED STATES PATENT OFFICE
CERTIFICATE OF CORRECTION

Patent No. 4,134,708　　　　　　　　　Dated January 16, 1979

Inventor(s)　Stanley O. and Bradley O. Brauser

It is certified that error appears in the above-identified patent and that said Letters Patent are hereby corrected as shown below:

Patent Office

Column 18, line 52, "268" should be --368--.

Column 24, line 35, "514" should be --524--.

Column 36, line 21, "21" should be --20--.

Column 36, lines 42, after "comprising:" --a high pressure limit switch; and -- should be a sub, sub paragraph.

Column 36, line 43, there should be a sub, sub paragraph between "and" and "a".

Signed and Sealed this

Third Day of April 1979

[SEAL]

Attest:

RUTH C. MASON
Attesting Officer

DONALD W. BANNER
Commissioner of Patents and Trademarks